United States Patent
Liu et al.

(10) Patent No.: US 10,814,876 B2
(45) Date of Patent: Oct. 27, 2020

(54) VEHICLE LANE-CHANGING CONTROL METHOD, VEHICLE LANE-CHANGING CONTROL DEVICE AND RELATED EQUIPMENT

(71) Applicants: Neusoft Corporation, Shenyang (CN); Neusoft Reach Automotive Technology (Shanghai) Co., Ltd., Shanghai (CN)

(72) Inventors: Wei Liu, Shenyang (CN); Wei Liu, Shenyang (CN); Lu Wei, Shenyang (CN)

(73) Assignee: NEUSOFT REACH AUTOMOTIVE TECHNOLOGY (SHANGHAI) CO., LTD., Shanghai (CN)

(*) Notice: Subject to any disclaimer, the term of this patent is extended or adjusted under 35 U.S.C. 154(b) by 233 days.

(21) Appl. No.: 15/933,329

(22) Filed: Mar. 22, 2018

(65) Prior Publication Data

US 2019/0100211 A1 Apr. 4, 2019

(30) Foreign Application Priority Data

Sep. 29, 2017 (CN) .......................... 2017 1 0909073

(51) Int. Cl.
*B60W 30/18* (2012.01)
*G05D 1/00* (2006.01)
(Continued)

(52) U.S. Cl.
CPC .. *B60W 30/18163* (2013.01); *B60W 30/0956* (2013.01); *G05D 1/0088* (2013.01);
(Continued)

(58) Field of Classification Search
CPC ........ B60W 30/18163; B60W 30/0956; G05D 1/0088; G05D 1/0214
See application file for complete search history.

(56) References Cited

U.S. PATENT DOCUMENTS 8,903,588 B2 * 12/2014 Schmudderich .. B60W 30/0956
701/23
9,159,023 B2 * 10/2015 Bone ............... B60W 30/18163
(Continued)

FOREIGN PATENT DOCUMENTS

CN 103029703 A 4/2013
CN 103310202 A 9/2013
(Continued)

OTHER PUBLICATIONS

JP Second Office Action dated Nov. 19, 2019 in the corresponding JP application(application No. 2018-049115).
(Continued)

*Primary Examiner* — Ramsey Refai
(74) *Attorney, Agent, or Firm* — Kilpatrick Townsend & Stockton LLP

(57) ABSTRACT

Provided are a vehicle lane-changing control method and a vehicle lane-changing control device. The method includes controlling a host vehicle to travel into a neighboring to-be-turned-into lane with a first control rule, acquiring a location relation between the host vehicle and a referential lane line in a real time manner. The referential lane line is located between the host vehicle and the to-be-turned-into lane. The method further includes determining whether the location relation meets a preset changing rule, and controlling an action of the host vehicle with a second control rule corresponding to the preset changing rule in a case that the location relation meets the preset changing rule.

13 Claims, 7 Drawing Sheets

(51) Int. Cl.
*G05D 1/02* (2020.01)
*B60W 30/095* (2012.01)

(52) U.S. Cl.
CPC ....... *G05D 1/0214* (2013.01); *B60W 2510/20* (2013.01); *B60W 2520/10* (2013.01); *B60W 2552/00* (2020.02); *B60W 2554/801* (2020.02); *G05D 2201/0212* (2013.01)

(56) References Cited

U.S. PATENT DOCUMENTS

| | | | |
|---|---|---|---|
| 9,475,491 | B1 | 10/2016 | Nagasaka et al. |
| 9,555,801 | B2 | 1/2017 | Yester et al. |
| 10,351,137 | B2 * | 7/2019 | Shin ..................... G05D 1/0088 |
| 10,514,457 | B2 * | 12/2019 | Talamonti ............. G01S 13/931 |
| 2013/0090825 | A1 | 4/2013 | Park |
| 2015/0251656 | A1 | 9/2015 | Yester et al. |
| 2016/0350606 | A1 | 12/2016 | Yoshitomi et al. |
| 2017/0008531 | A1 | 1/2017 | Watanabe |
| 2017/0233004 | A1 | 8/2017 | Hatano |
| 2017/0248959 | A1 | 8/2017 | Matsubara et al. |
| 2017/0334451 | A1 * | 11/2017 | Asakura ............ B60W 50/0098 |
| 2018/0120859 | A1 * | 5/2018 | Eagelberg ............ G05D 1/0246 |
| 2018/0188735 | A1 | 7/2018 | Sugawara et al. |
| 2019/0039626 | A1 | 2/2019 | Hatano |
| 2019/0061765 | A1 * | 2/2019 | Marden ................. B60W 30/18 |

FOREIGN PATENT DOCUMENTS

| | | |
|---|---|---|
| CN | 105216797 A | 1/2016 |
| CN | 105329238 A | 2/2016 |
| CN | 106335509 A | 1/2017 |
| JP | H0719882 A | 1/1995 |
| JP | 2010247656 A | 11/2010 |
| JP | 2013068986 A | 4/2013 |
| JP | 2016224718 A | 12/2016 |
| JP | 2017001665 A | 1/2017 |
| JP | 2017074806 A | 4/2017 |
| JP | 2017140857 A | 8/2017 |
| JP | 2017146794 A | 8/2017 |
| JP | 2017154554 A | 9/2017 |
| WO | 2017047261 A1 | 3/2017 |
| WO | 2017056726 A1 | 4/2017 |
| WO | 2017141396 A1 | 8/2017 |

OTHER PUBLICATIONS

JP Office Action dated Mar. 7, 2019 in the corresponding JP application (application No. 2018-049115).

* cited by examiner

… … …

VEHICLE LANE-CHANGING CONTROL METHOD, VEHICLE LANE-CHANGING CONTROL DEVICE AND RELATED EQUIPMENT

CROSS REFERENCE TO RELATED APPLICATION

The present application claims priority to Chinese Patent Application No. 201710909073.6, titled "VEHICLE LANE-CHANGING CONTROL METHOD, VEHICLE LANE-CHANGING CONTROL DEVICE AND RELATED EQUIPMENT", filed on Sep. 29, 2017 with the State Intellectual Property Office of the PRC, which is incorporated herein by reference in its entirety.

FIELD

The present disclosure relates to the technical field of autonomous driving, and particularly to a vehicle lane-changing control method, a vehicle lane-changing control device and related equipment.

BACKGROUND

Lane-changing is an inevitable action performed by a vehicle during traveling. In actual traveling process, reasons for lane-changing are various, including situations that have to change a lane (such as off-ramp, crossing turning lane, end of the current lane, narrowing of the lane, obstacles in the current lane, construction of the current lane, sudden emergency of the vehicle in front of the host vehicle in the current lane or the like) and situations that impact traveling (such as a vehicle with a too low speed in front of the host vehicle in the current lane, a vehicle carrying dangerous goods in front of the host vehicle in the current lane) and so on. When the above situations occur, lane-changing operation may need to be performed by the vehicle.

At the present stage, the basis of realizing autonomous driving is that a host vehicle travels on a road in which lanes are identified by lane lines. When a decision of lane-changing is made, lane-changing trajectory is determined by using the method of following a typical single-shift steering wheel steering angle change time sequence. A plan for lane-changing trajectory is made based on traveling environment of the host vehicle and a virtual lane-changing trajectory is generated in advance. And by controlling the steering wheel of the host vehicle to adjust the steering angle, the host vehicle shifts to a neighboring lane along the virtual lane-changing trajectory.

During the process of keeping the host vehicle traveling along the virtual lane-changing trajectory, the location relation between the host vehicle and the virtual lane-changing trajectory is not constant due to the actual complex road situation. Thus it is necessary to track and recognize dynamic locations of the host vehicle in a real time manner to estimate traveling states of the host vehicle. Based on this, the steering angle of the steering wheel of the host vehicle is adjusted, thereby keeping the host vehicle traveling along the virtual lane-changing trajectory. Therefore, problems of actual complex control algorithm and enormous system overhead are caused.

SUMMARY

Based on this, a vehicle lane-changing control method, a vehicle lane-changing control device and related equipment are provided by the present disclosure, to attain the problems of unreachable anticipated lane-changing results and inaccuracy of lane-changing results in technology.

A vehicle lane-changing control method is provided by embodiments of the present disclosure. The method includes:

controlling a host vehicle to travel into a neighboring to-be-turned-into lane with a first control rule;

acquiring a location relation between the host vehicle and a referential lane line in a real time manner, where the referential lane line is located between the host vehicle and the to-be-turned-into lane;

determining whether the location relation meets a preset changing rule; and controlling an action of the host vehicle with a second control rule corresponding to the preset changing rule in a case that the location relation meets the preset changing rule.

In one embodiment, the determining whether the location relation meets a preset changing rule includes:

determining that the location relation meets the preset changing rule in a case that front wheels of the host vehicle all cross the referential lane line; or determining that the location relation meets the preset changing rule in a case that the host vehicle totally travels into the to-be-turned-into lane and an angle between a course of the host vehicle and the referential lane line is less than a preset angle threshold.

In one embodiment, determining the first control rule and the second control rule includes:

acquiring a speed of the host vehicle; and determining a lane-changing rule corresponding to the speed, where the lane-changing rule is determined in advance based on a lane-changing operation actually performed when the host vehicle is drove by a driver at the speed and a lane-changing environment, and the lane-changing rule includes the first control rule and the second control rule.

In one embodiment, the lane-changing rule includes a steering wheel steering angle threshold and a steering wheel steering angular velocity; or the lane-changing rule includes a steering wheel steering angle threshold, a steering wheel steering angular velocity and a steering wheel steering angle hold time.

In one embodiment, before the controlling a host vehicle to travel into a neighboring to-be-turned-into lane with a first control rule, the method further includes:

acquiring traveling environment information on a surrounding environment of the host vehicle, where the traveling environment information includes a speed of the host vehicle and a speed and an orientation of an obstacle in the same lane as the host vehicle and in a neighboring lane neighboring to the lane where the host vehicle locates; and determining whether it is feasible for the host vehicle to change the lane where the host vehicle locates to a candidate lane based on the traveling environment information, where the candidate lane is a left neighboring lane or a right neighboring lane neighboring to the lane where the host vehicle locates; where the host vehicle is controlled to travel into the neighboring to-be-turned-into lane with the first control rule in a case that it is feasible for the host vehicle to change the lane where the host vehicle locates to the candidate lane.

In one embodiment, the determining whether it is feasible for the host vehicle to change the lane where the host vehicle locates to a candidate lane includes:

determining whether it is feasible for the host vehicle to change the lane where the host vehicle locates to the candidate lane based on speeds of the host vehicle, a first tracking object and a second tracking object, and distances from the host vehicle to the first tracking object and the second tracking object, where the first tracking object is an obstacle in front of the host vehicle in the candidate lane, and the second tracking object is an obstacle behind the host vehicle in the candidate lane.

In one embodiment, the determining whether it is feasible for the host vehicle to change the lane where the host vehicle locates to the candidate lane based on speeds of the host vehicle, a first tracking object and a second tracking object, and distances from the host vehicle to the first tracking object and the second tracking object includes:

acquiring a steering entry point of the host vehicle based on the speed of the host vehicle and a preset lateral acceleration threshold, where the steering entry point is located on a lane line between the host vehicle and the candidate lane;

determining whether a relative speed of the first tracking object with respect to the host vehicle is greater than or equal to zero and whether a distance between the first tracking object and the steering entry point is greater than a preview distance of the host vehicle after a first preset time, where the preview distance is a distance travelled by the host vehicle during a preset steering preview time period; and determining that a front lane-changing condition is met in a case that the relative speed of the first tracking object with respect to the host vehicle is greater than or equal to zero and the distance between the first tracking object and the steering entry point is greater than the preview distance after the first preset time;

determining whether a relative speed of the second tracking object with respect to the host vehicle is less than or equal to zero and whether a distance between the second tracking object and the steering entry point is greater than the preview distance after the first preset time; and determining that a back lane-changing condition is met in a case that the relative speed of the second tracking object with respect to the host vehicle is less than or equal to zero and the distance between the second tracking object and the steering entry point is greater than the preview distance after the first preset time; and determining that it is feasible for the host vehicle to change the lane where the host vehicle locates to the candidate lane after the first preset time in a case that both the front lane-changing condition and the back lane-changing condition are met.

In one embodiment, after the acquiring traveling environment information on a surrounding environment of the host vehicle, the method further includes performing at least one of determining operations including:

determining whether it is necessary for the host vehicle to change the lane where the host vehicle locates based on a global path planning, where the global path planning includes lane end recognition and navigation path recognition; and determining whether the traveling environment information meets a preset vehicle following condition; where the host vehicle is controlled to travel into the neighboring to-be-turned-into lane with the first control rule in a case that it is feasible for the host vehicle to change the lane where the host vehicle locates to the candidate lane and at least one of following two cases occurs, the two cases includes one case that it is necessary for the host vehicle to change the lane where the host vehicle locates and the other case that the traveling environment information does not meet the preset vehicle following condition.

In one embodiment, the determining whether the traveling environment information meets a preset vehicle following condition includes:

determining whether a speed of a third tracking object is less than a preset speed and whether a difference between the speed of the third tracking object and the preset speed is greater than or equal to a preset speed difference threshold; and determining that the traveling environment information does not meet the vehicle following condition in a case that the speed of the third tracking object is less than the preset speed and the difference between the speed of the third tracking object and the preset speed is greater than or equal to the preset speed difference threshold, where the third tracking object is an obstacle in front of the host vehicle in the same lane as the host vehicle; or determining whether a rest time period in which the host vehicle does not move is greater than or equal to a preset first waiting time period in a case that both the speed of the host vehicle and a speed of a third tracking object are zero; and determining that the traveling environment information does not meet the vehicle following condition in a case that the rest time period of the host vehicle is greater than or equal to the preset first waiting time period; or determining whether a speed of a third tracking object is less than a preset speed and whether a difference between the speed of the third tracking object and the preset speed is greater than or equal to a preset speed difference threshold; counting a duration time period in which the difference between the speed of the third tracking object and the preset speed is greater than or equal to the preset speed difference threshold in a case that the speed of the third tracking object is less than the preset speed and the difference between the speed of the third tracking object and the preset speed is greater than or equal to the preset speed difference threshold; and determining that the traveling environment information does not meet the vehicle following condition in a case that the duration time period is greater than a preset second waiting time period.

A vehicle lane-changing control device is provided by embodiments of the present disclosure. The device includes: a rule changing device, a steering control device, a location monitoring device and a location determining device. The rule changing device is configured to: send a first control rule to a steering control device; and send a second control rule corresponding to a preset changing rule to the steering control device in a case that the location determining device determines that a location relation between a host vehicle and a referential lane line meets the preset changing rule, where the referential lane line is located between the host vehicle and a to-be-turned-into lane. The steering control device is configured to: control the host vehicle to travel into a neighboring to-be-turned-into lane with the first control rule sent by the rule changing device; and control the host vehicle to travel into the neighboring to-be-turned-into lane with the second control rule sent by the rule changing device. The location monitoring device is configured to acquire the location relation between the host vehicle and the referential lane line in a real time manner. The location determining device is configured to determine whether the location relation meets the preset changing rule.

A computer readable storage medium is also provided by embodiments of the present disclosure. The medium is stored with computer programs, and the computer programs, when executed by a processor, cause the processor to perform the vehicle lane-changing control method described in the above embodiments.

A vehicle controller is also provided by embodiments of the present disclosure. The vehicle controller includes: a memory and a processor. The memory is configured to store program codes and transmit the program codes to the processor. The processor is configured to perform the vehicle lane-changing control method described in the above embodiments according to instructions in the program codes.

According to embodiments of the present disclosure, during the process of controlling the host vehicle to change a lane, the host vehicle is firstly controlled to travel into the neighboring to-be-turned-into lane with the first control rule, the location relation between the host vehicle and the referential lane line located between the host vehicle and the to-be-turned-into lane is acquired in a real time manner, and it is determined whether the location relation meets the preset changing rule. In a case that the location relation meets the preset changing rule, the control rule for controlling the host vehicle is changed to the second control rule corresponding to the preset changing rule, thus an actual lane-changing control rule for the host vehicle is combined with postures of the host vehicle in and between the lanes. Based on the relation between the actual location of the host vehicle and the location of the referential lane line, the lane-changing control rule is changed to control lane-changing actions performed by the host vehicle. It is ensured that, the steering control on the host vehicle during the lane-changing process conforms to actual situations in the lane, and lane-changing results that are more accurate and more in line with the actual situations are obtained without planning for a virtual lane-changing trajectory in advance. In addition, during the controlling process, it is unnecessary to plan for a virtual lane-changing trajectory in advance, and complex control algorithms and control flows needed for changing a lane along the lane-changing trajectory are abandoned, thereby decreasing the complexity of algorithms and flows and reducing the system overhead while ensuring the accuracy of lane-changing results.

Additionally, in some possible implementation of the present disclosure, before controlling the host vehicle to perform lane-changing, traveling environment information on a surrounding environment of the host vehicle is acquired firstly, and it is determined whether the preset lane-changing conditions are met based on the traveling environment information. The lane-changing conditions include a condition indicating whether it is necessary for the host vehicle to change the lane and a condition indicating whether it is feasible for the host vehicle to change the lane, that is, the necessity and feasibility of lane-changing. The necessity of lane-changing in different cases is determined by the combination of a speed threshold and a vehicle following time threshold or the like. The feasibility of lane-changing is determined by modeling a three-lane five-object local environment and tracking and predicting motion of an object in the local environment model, and a safe lane-changing space is ensured. When the preset lane-changing conditions are satisfied, the host vehicle is controlled to perform lane-changing, and the lane-changing control is triggered by triggering conditions of the necessity and feasibility instead of lane-changing actions triggered by a person. Therefore, the feasibility of actual lane-changing is ensured while abandoning lane-changing trajectory planning and tracking, and lane-changing control of the host vehicle is realized without complex lane-changing control algorithms. And the lane-changing control method and control algorithms applied in the actual lane-changing process are simplified.

BRIEF DESCRIPTION OF THE DRAWINGS

The drawings to be used in the descriptions of embodiments of the present disclosure are described briefly as follows. Apparently, the drawings in the following descriptions only illustrate some embodiments of the present disclosure.

DETAILED DESCRIPTION OF EMBODIMENTS

Embodiments of the present disclosure will be described as follows in conjunction with the accompany drawings in the embodiments of the present disclosure. It is apparent that the described embodiments are only a part of the embodiments according to the present disclosure.

The realization of autonomous driving may need to be integrated into the traveling environment of vehicles. That is, a host vehicle travels on a road in which lanes are identified by lane lines. In the existing lane-changing control method, a lane-changing trajectory is determined by using the method of following a typical single-shift steering wheel steering angle change time sequence. A plan for the lane-changing trajectory is made based on traveling environment of the host vehicle and a virtual lane-changing trajectory is generated in advance. And by controlling the steering wheel of the host vehicle to adjust the steering angle, the host vehicle shifts to a neighboring lane along the virtual lane-changing trajectory. During the process of keeping the host vehicle traveling along the virtual lane-changing trajectory, the location relation between the host vehicle and the virtual lane-changing trajectory is not constant due to the actual complex road situation. Thus it is necessary to track and recognize dynamic locations of the host vehicle in a real time manner to estimate traveling states of the host vehicle. Based on this, the steering angle of the steering wheel of the host vehicle is adjusted, thereby keeping the host vehicle traveling along the virtual lane-changing trajectory. Therefore, problems of actual complex control algorithm and enormous system overhead are caused.

A vehicle lane-changing control method and a vehicle lane-changing control device are provided by embodiments of the present disclosure. The lane-changing of the host vehicle is controlled based on the actual lane-changing process. Postures of the host vehicle in the lane and between the lanes are associated with lane-changing steering actions performed by the host vehicle actually. Lane-changing control that is more in line with the actual road situation is realized while planning for a virtual lane-changing trajectory in advance is unnecessary and complex control algorithms and control flows required when changing the lane along the lane-changing trajectory are abandoned. Therefore, not only the accuracy of lane-changing result is ensured, but also the complexity of algorithm and flow is decreased, and the system overhead is reduced.

Based on the above concept, to make the above objective, features and advantages of the present disclosure easier to understand, specific embodiments of the present disclosure are described in detail in conjunction with the drawings as follows.

Figure 1:
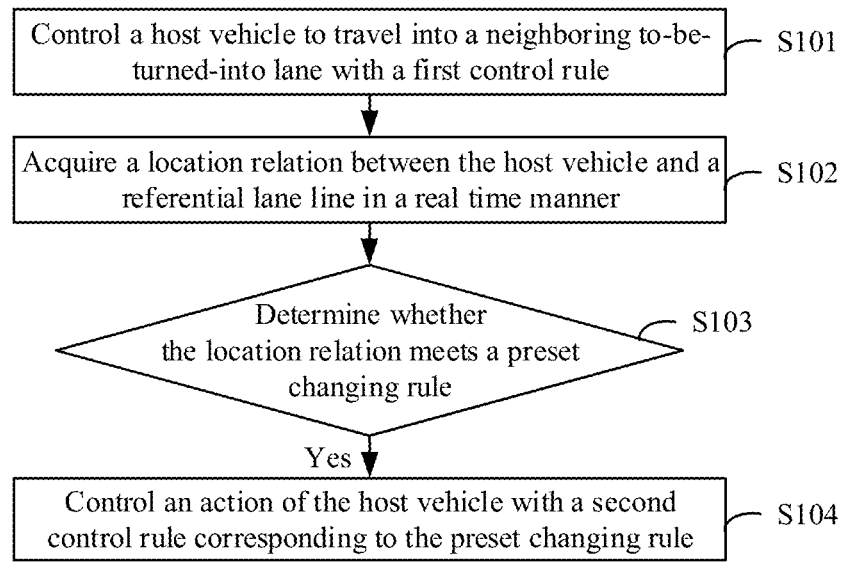
FIG. 1 is a schematic flow chart of a vehicle lane-changing control method according to an embodiment of the present disclosure.

Reference is made to FIG. 1, which is a schematic flow chart of a vehicle lane-changing control method according to an embodiment of the present disclosure. The vehicle lane-changing control method according to the embodiment of the present disclosure includes the following steps S101 to S104.

In step S101, a host vehicle is controlled to travel into a neighboring to-be-turned-into lane with a first control rule.

In the embodiment of the present disclosure, the neighboring to-be-turned-into lane may be determined in advance when lane-changing is triggered, the neighboring to-be-turned-into lane may be any lane that meets a preset lane-changing condition among neighboring lanes on left and right sides of the host vehicle. As to how to determine the to-be-turned-into lane, it will be illustrated in detail later, thus it is not described here. According to the first control rule, the host vehicle may shift to the to-be-turned-into lane, travel into the to-be-turned-into lane, or keep traveling in the to-be-turned-into lane to realize the lane-changing.

To ensure the accuracy of lane-changing control, a speed of the host vehicle during the lane-changing process generally keeps constant, and steering of the steering wheel of the host vehicle is controlled to shift the course of the host vehicle, and thus the host vehicle travels into the to-be-turned-into lane and the lane-changing is completed. Therefore, in specific embodiments, the first control rule may be a rule for controlling the steering of the steering wheel of the host vehicle, such as rules for the steering angle and the angular velocity of the steering wheel, or the like.

For example, change time sequence of steering wheel steering angle controlled by a driver during the lane-changing process may be recorded in advance based on actual lane-changing actions of the driver when driving the host vehicle under different speeds. The first control rule for controlling the host vehicle to change the lane in the embodiment of the present disclosure is obtained based on the change time sequence of steering wheel steering angle.

In step S102, a location relation between the host vehicle and a referential lane line is acquired in a real time manner.

The referential lane line is located between the host vehicle and the to-be-turned-into lane. If the to-be-turned-into lane is a neighboring lane on the left side of the host vehicle, the referential lane line is a neighboring lane line on the left side of the host vehicle. And if the to-be-turned-into lane is a neighboring lane on the right side of the host vehicle, the referential lane line is a neighboring lane line on the right side of the host vehicle.

In the embodiment of the present disclosure, an environmental sensor, such as a camera, provided on the host vehicle in advance may be used to acquire the location relation between the host vehicle and the referential lane line in a real time manner. The location relation between the host vehicle and the referential lane line may include the following situations: the host vehicle has not yet crossed the referential lane line, a front wheel of the host vehicle hits the referential lane line, a front wheel of the host vehicle totally crosses the referential lane line, a rear wheel of the host vehicle totally crosses the referential lane line, and the host vehicle travels parallel to the referential lane line, etc. One or more of the location relations may be acquired in a real time manner according to actual requirements, to make the lane-changing control for the host vehicle in accordance with actual road environment. Therefore, accurate lane-changing of the host vehicle is realized without planning for a virtual lane-changing trajectory. The specific acquired location relation is not limited by the embodiment of the present disclosure.

In step S103, it is determined whether the location relation meets a preset changing rule.

In the embodiment of the present disclosure, the preset changing rule is used to mark a node for adjusting the control rule based on the location relation between the host vehicle and the referential lane line. In the case that the location relation between the host vehicle and the referential lane line meets the preset changing rule, the control rule is adjusted, to avoid situations such as over-adjustment that may impact the accuracy of lane-changing.

Since actual lane-changing environment is complex and flexible, it is necessary to adjust the control rule applied actually based on the location relation between the host vehicle and the referential lane line during the lane-changing process, so that the control rule is adapted to current lane-changing environment and accurate lane-changing results are ensured. That is, it is necessary to determine whether the location relation between the host vehicle and the referential lane line meets the preset changing rule, and to determine whether the current traveling situation of the host vehicle requires to be adjusted, to realize accurate lane-changing.

The location relation between the host vehicle and the referential lane line may include the following situations: the host vehicle has not yet crossed the referential lane line, a front wheel of the host vehicle hits the referential lane line, a front wheel of the host vehicle totally crosses the referential lane line, a rear wheel of the host totally crosses the referential lane line, and the host vehicle travels parallel to the referential lane line, etc. For example, in the case of controlling the host vehicle to shift to the to-be-turned-into lane with the first control rule, the control rule may need to be adjusted after front wheels totally cross the referential lane line, to avoid situations such as over-adjustment that impact the accuracy of lane-changing. Thus, before the host vehicle travels into the to-be-turned-into lane, the preset changing rule is that a front wheel totally crosses the referential lane line. In a case that the location relation between the host vehicle and the referential lane line is that the front wheels of the host vehicle all cross the referential lane line, it is determined that the location relation meets the preset changing rule. In another example, in the case of adjusting the course of the host vehicle with the first control rule to make the host vehicle be in a lane-keeping state after the host vehicle totally travels into the to-be-turned-into lane, it is necessary to adjust the control rule if an angle between the course of the host vehicle and the referential lane line is less than a preset angle threshold, so that the course of the host vehicle is fine adjusted to make the host vehicle be in the lane-keeping state and the lane-changing control is ended. That is, after the host vehicle totally travels into the to-be-turned-into lane, the preset changing rule is that an angle between the course of the host vehicle and the referential lane line is less than a preset angle threshold. In a case that the host vehicle totally travels into the to-be-turned-into lane and the angle between the course of the host vehicle and the referential lane line is less than the preset angle threshold, it is determined that the location relation meets the preset changing rule.

In step S104, an action of the host vehicle is controlled with a second control rule corresponding to the preset changing rule in a case that the location relation meets the preset changing rule.

In the embodiment of the present disclosure, the second control rule is used to control an action of the host vehicle to complete the lane-changing. The second control rule also may be a rule for controlling the steering of the steering wheel of the host vehicle, such as rules for the steering angle and the angular velocity of the steering wheel, or the like.

In practice, the lane-changing control process may be divided into different stages according to the location relation between the host vehicle and the referential lane line, and the host vehicle is controlled in different stages to shift to the to-be-turned-into lane, and to complete the lane-changing process. In each stage, based on the location relation between the host vehicle and the referential lane line, different control rule is applied to control the lane-changing of the host vehicle. It is determined whether the next stage is started with the preset changing rule, and the control rule is changed when necessary, to achieve an expected lane-changing goal corresponding to the steering control stage. Thus, the steering control in the lane-changing process is based on the actual road situation, and the host vehicle is ensured to travel into the to-be-turned-into lane precisely, and the expected steering result is achieved. Different control rules may be set in advance, and the location relation between the host vehicle and the referential lane line is monitored in a real time manner and the control rule is adjusted based on the location relation, in this way, the lane-changing control of the host vehicle is realized without complex control algorithms and control flows.

According to embodiments of the present disclosure, during the process of controlling the host vehicle to change a lane, the host vehicle is firstly controlled to travel into the neighboring to-be-turned-into lane with the first control rule, the location relation between the host vehicle and the referential lane line located between the host vehicle and the to-be-turned-into lane is acquired in a real time manner, and it is determined whether the location relation meets the preset changing rule. In a case that the location relation meets the preset changing rule, the control rule for controlling the host vehicle is changed to the second control rule corresponding to the preset changing rule, thus an actual lane-changing control rule for the host vehicle is combined with postures of the host vehicle in and between the lanes. Based on the relation between the actual location of the host vehicle and the location of the referential lane line, the lane-changing control rule is changed to control lane-changing actions performed by the host vehicle. It is ensured that, the steering control on the host vehicle during the lane-changing process conforms to the actual road situation, and lane-changing results that are more accurate and more in line with the actual situations are obtained without planning for a virtual lane-changing trajectory in advance. In addition, during the controlling process, it is unnecessary to plan for a virtual lane-changing trajectory in advance, and complex control algorithms and control flows needed for changing a lane along the lane-changing trajectory are abandoned, thereby decreasing the complexity of algorithms and flows and reducing the system overhead while ensuring the accuracy of lane-changing results.

Examples are taken as follows to illustrate how to determine the first control rule and the second control rule.

It can be understood that, before controlling lane-changing of the host vehicle, it may need to acquire the first control rule and the second control rule for lane-changing control in advance. The method for determining the first control rule and the second control rule includes: acquiring a speed of the host vehicle; and determining a lane-changing rule corresponding to the speed, where the lane-changing rule is determined in advance based on a lane-changing operation actually performed when the host vehicle is drove by a driver at the speed and a lane-changing environment, and the lane-changing rule includes the first control rule and the second control rule.

It can be understood that, there are great differences in driving trajectories of the host vehicle caused by the same steering wheel steering angle under different speeds. The lane-changing of the host vehicle has to be controlled based on the speed of the host vehicle, to acquire accurate lane-changing results. In practice, the speed of the host vehicle may be acquired from a control system of the host vehicle, and may also be measured by using an environmental sensor. The way to acquire the speed of the host vehicle is not limited by the embodiment of the present disclosure, and is not described hereinafter.

In the embodiment of the present disclosure, the lane-changing operation is a steering operation of the steering wheel controlled by the driver. Lane-changing environment is an actual location of the host vehicle during the lane-changing process, and includes the location relation between the host vehicle and the referential lane line.

To ensure the accuracy and comfort of lane-changing, in the embodiment of the present disclosure, lane-changing rules (that is, the first control rule and the second control rule) applied during the lane-changing control are determined by actual lane-changing operations of the driver, and the lane-changing rules are divided based on the lane-changing environment and the preset changing rule to acquire the first control rule and the second control rule. The steering operation of the steering wheel performed by the driver, before the location relation between the host vehicle and the referential lane line meets the preset changing rule, is determined as the first control rule. The steering operation of the steering wheel performed by the driver, after the location relation between the host vehicle and the referential lane line meets the preset changing rule, is determined as the second control rule. The lane-changing rule may include: a steering wheel steering angle threshold (such as a maximum steering angle and a minimum steering angle) and a steering wheel steering angular velocity. Or the lane-changing rule may include: a steering wheel steering angle threshold, a steering wheel steering angular velocity and a steering wheel steering angle hold time. In practice, the lane-changing rule may be represented by a steering wheel steering angle time sequence shown in FIG. 2, in which a steering wheel steering angle change curve determined by actual traveling situations and lane-changing environment is illustrated.

In practice, the lane-changing rule may also be determined according to different driving habits of different drivers when driving the host vehicle, thus the steering control performed on the host vehicle is in accordance with the driving habit of the driver.

Examples are made to illustrate how to control the host vehicle to cross the referential lane line and to travel into the to-be-turned-into lane to complete the lane-changing based on the location relation between the host vehicle and the referential lane line in conjunction with specific application scenarios hereinafter.

Figure 3:
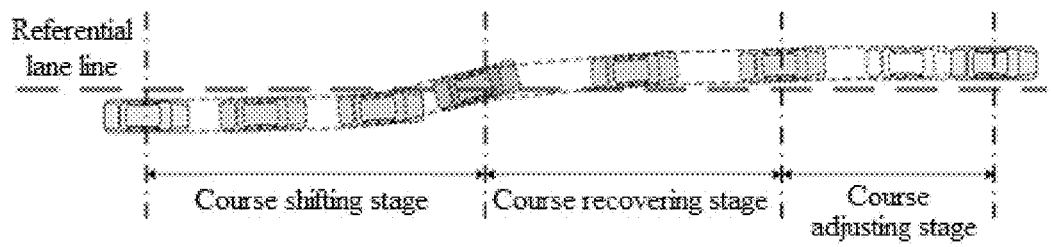
FIG. 3 is a schematic diagram illustrating an orientation and a posture of a host vehicle during a lane-changing process in a vehicle lane-changing control method according to an embodiment of the present disclosure.

In the embodiment of the present disclosure, the whole lane-changing process may be divided into three stages based on the location relation between the host vehicle and the referential lane line. Three stages are a course shifting stage, a course recovering stage and a course adjusting stage respectively. A corresponding control rule is used to perform control on the host vehicle in different stages, and the lane-changing is achieved by controlling executing agency such as a steering system, a driving system, a braking system or the like of the host vehicle to adjusting traveling states and vehicle body postures of the host vehicle. Reference is made to FIG. 3, which shows a specific lane-changing stage by taking an example of turning into the left-side lane. Control flows in each stage are illustrated in detail hereinafter. The control flows of turning into the right-side lane are similar to that of turning into the left-side lane, and will not described in the following.

In the course shifting stage, a corresponding control rule is applied to control the steering wheel of the host vehicle to shift, to make the host vehicle shift to a target direction of lane-changing at a specific speed. By adjusting the steering angle of the steering wheel of the host vehicle and the speed of the host vehicle in some cases, course of the host vehicle is shifted, and preparations for crossing the referential lane line and traveling into the to-be-turned-into lane are made.

In practice, the course shifting may also be realized by controlling the steering angle of the steering wheel of the host vehicle and an open-close degree of the accelerator and brake. Specific control rule may be set according to actual situations, which is not described here.

When the front wheels of the host vehicle all cross the referential lane line, it illustrates that the course of the host vehicle is enough for lane-changing, and the course of the host vehicle may need to be recovered timely to make the host vehicle keep traveling in the to-be-turned-into lane. Thus the course recovering stage is entered.

In the course recovering stage, a corresponding control rule is applied to control the host vehicle to travel into the to-be-turned-into lane, and to adjust the course of the host vehicle. By adjusting the steering angle of the steering wheel of the host vehicle, the course of the host vehicle is recovered, and thus the host vehicle keeps traveling in the to-be-turned-into lane.

If an angle between the course of the host vehicle and the referential lane line is less than a preset angle threshold (such as 5° or 6°), that is, the course of the host vehicle is basically in line with the direction of the referential lane line, it illustrates that the host vehicle is generally able to keep traveling in the to-be-turned-into lane. However, it also may need to finely adjust the course of the host vehicle with a third control rule, to make the angle between the course of the host vehicle and the referential lane line less than a lane-keeping angle threshold (the lane-keeping angle threshold may be a value ranging from 0.5° to 2°), and make the host vehicle be in a lane-keeping state. Therefore, the host vehicle is controlled to keep traveling in the to-be-turned-into lane, and the lane-changing is completed.

In the course adjusting stage, a corresponding control rule is applied to adjust the traveling postures of the host vehicle. By adjusting the steering angle of the steering wheel of the host vehicle, the course of the host vehicle is adjusted finely, and the host vehicle enters the lane-keeping state.

It should be noted that, since the actual road situation is complex and flexible, the actual lane-changing control process may not include the all three stages. The course adjusting stage may be entered directly from the course shifting stage, or the lane-keeping state is entered directly from the course recovering stage. In practice, the lane-changing of the host vehicle is realized by dividing the lane-changing process into stages and controlling the lane-changing of the host vehicle based on the changing rule. Therefore, the first control rule and the second control rule in the lane-changing method shown in FIG. 1 may be the control rules corresponding to the course shifting stage and the course recovering stage respectively, and also may be the control rules corresponding to the course shifting stage and the course adjusting stage respectively, or corresponding to the course recovering stage and the course adjusting stage respectively.

The control rules corresponding to the stages are illustrated in detail hereinafter in conjunction with a steering wheel steering angle change curve under a low speed in an example shown in FIG. 4.

Figure 4:
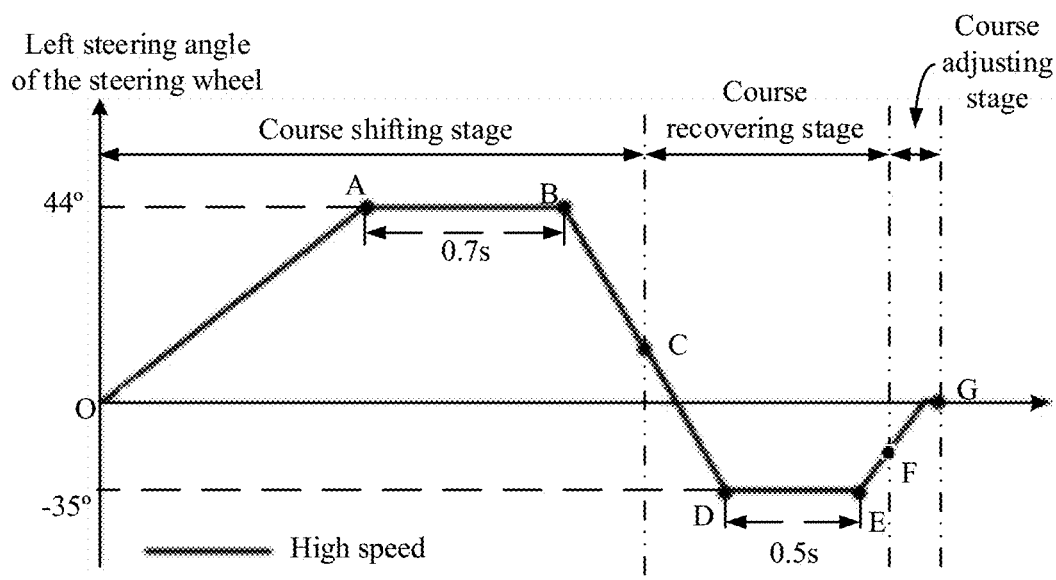
FIG. 4 is a schematic diagram illustrating a steering wheel steering angle change curve in each control stage during a lane-changing process according to an embodiment of the present disclosure.

It should be noted that, a positive direction of the vertical axis in FIG. 4 represents that an angle rotated to the left by the steering wheel is a positive value, and a negative direction of the vertical axis represents that an angle rotated to the right by the steering wheel is a negative value. Increase in the steering wheel steering angle represents that the steering wheel is steered to a target direction of lane-changing, while decrease in the steering wheel steering angle represents that the steering wheel is steered against the target direction of lane-changing.

In the course shifting stage, the control rule includes three phases: phase 1.1, phase 1.2 and phase 1.3. Steering wheel steering angle change curves in the phases correspond to the line segment OA, the line segment AB and the line segment BC respectively.

In the phase 1.1, that is, the line segment OA, the steering wheel steering angle is controlled to increase to a first steering angle threshold with a first increasing rate. The course of the host vehicle points to the referential lane line to prepare for course shifting.

In the phase 1.2, that is, the line segment AB, the first steering angle threshold is maintained by the steering wheel during a first preset time period for course shifting.

In the phase 1.3, that is, the line segment BC, the steering wheel steering angle is controlled to decrease with a first decreasing rate. Before the course of the host vehicle basically meets course shifting requirements of lane-changing, the steering wheel steering angle is decreased to avoid over-adjustment. Generally, during the process indicated by the line segment BC, front wheels of the host vehicle have all crossed the referential lane line. If not all the front wheels of the host vehicle have crossed the referential lane line, the steering wheel steering angle is controlled to decrease to a second steering angle threshold to avoid over-adjustment. If all the front wheels of the host vehicle cross the referential lane line, the course shifting stage is ended and the course recovering stage is entered.

In the course recovering stage, similarly, the control rule includes three phases: phase 2.1, phase 2.2 and phase 2.3. Steering wheel steering angle change curves in the phases correspond to the line segment CD, the line segment DE and the line segment EF respectively.

In the phase 2.1, that is, the line segment CD, the steering wheel steering angle is controlled to decrease to a third steering angle threshold with a second decreasing rate. The steering wheel steering angle is continuously decreased in the to-be-turned-into lane to avoid over-adjustment.

In the phase 2.2, that is, the line segment DE, the third steering angle threshold is maintained by the steering wheel during a second preset time period, to make the course of the host vehicle recover to be parallel to the referential lane line.

In the phase 2.3, that is, the line segment EF, the steering wheel steering angle is controlled to increase with a second increasing rate to avoid over-adjustment. During the process indicated by the line segment EF, the course of the host vehicle is enough for lane-changing, and it is necessary to recover the course of the host vehicle timely, to keep the host vehicle traveling in the to-be-turned-into lane. The course recovering stage is ended, and the course adjusting stage is entered.

In the course adjusting stage, the control rule corresponds to the portion from point F to point G on the curve. The steering wheel is controlled to return, and fine adjustment is performed on the host vehicle to make the host vehicle enter the lane-keeping state, that is, a state that keeps traveling in the to-be-turned-into lane.

It should be noted that, during the actual control process, actual situations in the course shifting stage, the course recovering stage and the course adjusting stage may do not correspond to the above steering wheel steering angle change curves due to influence of the speed of the host vehicle and the actual road situation. It may need to perform control on lane-changing of the host vehicle on the basis of rules in the course shifting stage, the course recovering stage and the course adjusting stage to ensure the accuracy of lane-changing results.

For example, in the process of increasing the steering wheel steering angle in the course shifting stage, if all the front wheels of the host vehicle cross the referential lane line, the course shifting stage is ended and the course recovering stage is entered. Therefore, the steering wheel steering angle is decreased to control the host vehicle to travel into the to-be-turned-into lane with the second control rule.

In implementation of the embodiments of the present disclosure, the steering action of the vehicle is related to the type and the speed of the vehicle, thus the parameters for indicating change in steering wheel steering angle in the above control rules, for example, the first increasing rate, the first steering angle threshold, the first preset time period, the first decreasing rate, the second steering angle threshold, the second decreasing rate, the third steering angle threshold, the second preset time period, the second increasing rate and so on, may be determined in advance based on the actual steering actions performed when the host vehicle is drove by the driver at different speeds. That is, the control rules may be determined in advance based on actual steering actions performed when the host vehicle is drove by the driver at different speeds (that is, the above parameters, such as the first increasing rate, the first steering angle threshold, the first preset time period, the first decreasing rate, the second steering angle threshold, the second decreasing rate, the third steering angle threshold, the second preset time period, the second increasing rate, are related to the speed of a specific vehicle). Therefore, the lane-changing process controlled by the method in the disclosure is closer to the actual lane-changing process in which the vehicle is controlled by the driver, and is more consistent with lane-changing control logic of manual driving behaviors, thereby improving the comfort of passengers.

Figure 2:
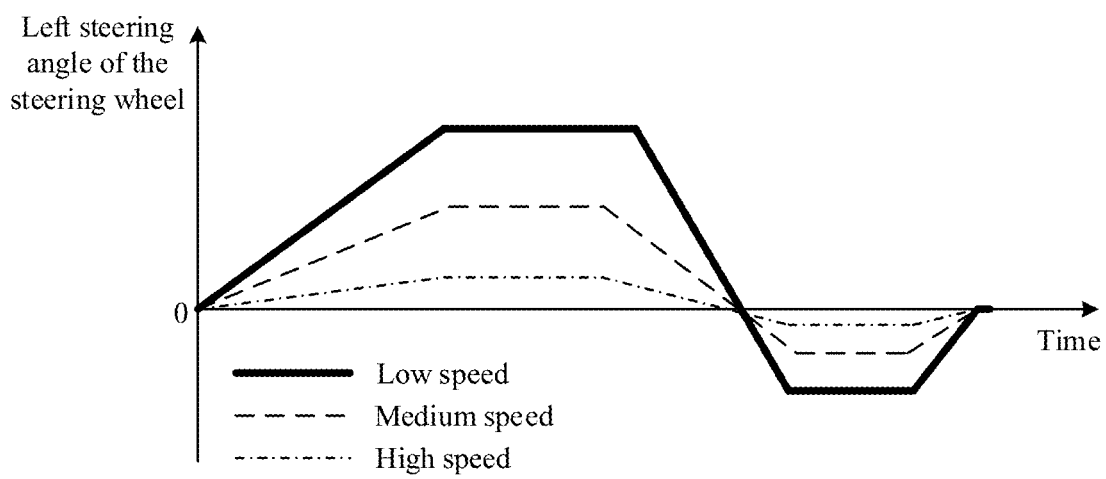
FIG. 2 is a schematic diagram illustrating an steering wheel steering angle time sequence determined in an embodiment of the present disclosure.

It can be understood that, the increasing rate and decreasing rate of the steering wheel steering angle in the embodiment of the present disclosure are determined based on actual driving habits of the driver, so the increasing rate and/or decreasing rate in the same stage may be not constant, and FIGS. 2 and 4 are only illustrative.

In one embodiment, in practice, the first control rule, the second control rule and the third control rule may be trained for different drivers based on different driving habits of different drivers when driving the host vehicle. The steering control on the host vehicle is in line with the driving habit of the driver.

Detailed descriptions are made to illustrate the lane-changing control method provided by embodiments of the present disclosure in conjunction with specific application scenarios hereinafter. It is assumed that, the host vehicle is in a low-speed traveling state (for example, 10 km/h) and is to travel into the left lane.

Reference is made to FIG. 4, when the lane-changing process begins and the course shifting stage is entered, the steering wheel is controlled to steer left to a left 44° angle (i.e. the line segment OA) with the first increasing rate, and the left 44° angle is kept for 0.7 seconds (i.e. the line segment AB). Then the steering wheel is controlled to steer right to a left 8° angle (i.e. point C) with the first decreasing rate. In this case, all the front wheels of the host vehicle cross the referential lane line and the course recovering stage is entered. In the course recovering stage, the steering wheel is controlled to steer right to a right 35° angle (i.e. the line segment CD) with the second decreasing rate, and the right 35° angle is kept for 0.5 seconds (i.e. the line segment DE). After that, the steering wheel is controlled to steer left to a right 20° angle (i.e. point F) with the second increasing rate. In this case, the course of the host vehicle is enough for lane-changing, and the course adjusting stage is entered. In the course adjusting stage, the steering wheel is controlled to return and the course of the host vehicle is adjusted fine, thereby making the host vehicle in a lane-keeping state and keeping the host vehicle traveling in the to-be-turned-into lane.

In the above embodiments of the present disclosure, descriptions are made to illustrate how to control the host vehicle to perform lane-changing actions. However, it may be feasible for the host vehicle to change the lane in the actual traveling environment when the lane-changing is triggered by a user or other device, because a plan for a virtual lane-changing trajectory is not made in the embodiments of the present disclosure. Therefore, before step S101, the feasibility of lane-changing is required to be determined. It is determined whether the traveling environment of the host vehicle meets the lane-changing condition, that is, it is determined whether it is feasible for the host vehicle to change the lane. In a case that the lane-changing condition is met, the lane-changing control is triggered, and the host vehicle is controlled to shift to a target direction and the lane-changing is completed.

Figure 5:
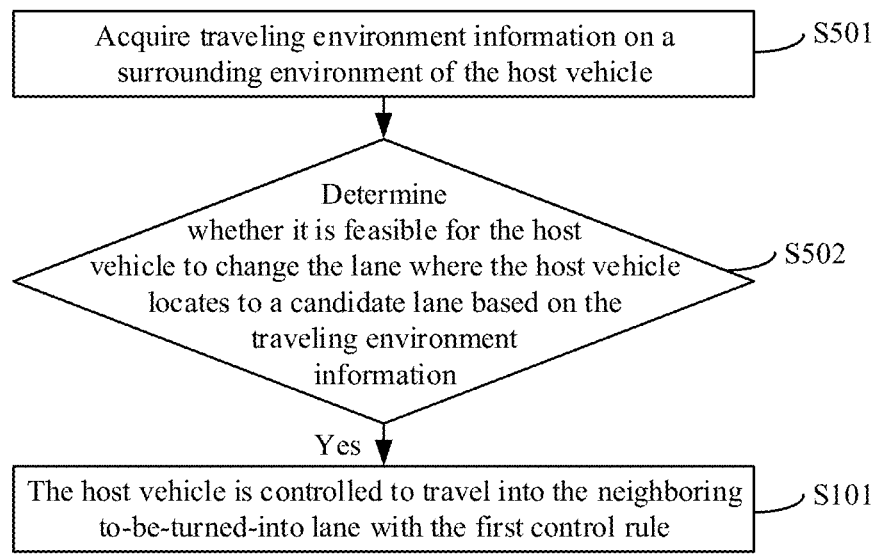
FIG. 5 is a schematic flow chart of a vehicle lane-changing control method according to an embodiment of the present disclosure.

In some possible implementations of the present disclosure, as shown in FIG. 5, before step S101, the method may further include the following steps S501 to S502.

In step S501, traveling environment information on a surrounding environment of the host vehicle is acquired.

The traveling environment information includes a speed of the host vehicle and a speed and an orientation of an obstacle (for example, a vehicle, a pedestrian) in the same lane as the host vehicle and in a neighboring lane neighboring to the lane where the host vehicle locates. The traveling environment information may include the speed of the host vehicle, speeds and orientations of an obstacle in front of the host vehicle and an obstacle behind the host vehicle in the same lane as the host vehicle, speeds and orientations of an obstacle in front of the host vehicle and an obstacle behind the host vehicle in the left lane, and speeds and orientations of an obstacle in front of the host vehicle and an obstacle behind the host vehicle in the right lane. It can be understood that, the traveling environment information is related to actual traveling environment of the host vehicle. If the host vehicle is located in the rightmost lane, the traveling environment information does not include the speeds and orientations of the obstacle in front of the host vehicle and the obstacle behind the host vehicle in the right lane, and other similar situations are in the same way, which are not described here. In explanations for the embodiments of the present disclosure, it is assumed that, both the right lane and the left lane of the host vehicle exist, and there are obstacles in front of the host vehicle and behind the host vehicle in the right lane, the left lane and the lane where the host vehicle locates. The control methods for other special cases are similar to the method described here, and one may refer to the relevant description for details, which is not described here.

The traveling environment information may be obtained by various sensors for environment sensing and object detection, for example, a high-precision positioning and navigation device, a camera device, a laser radar, a millimeter-wave radar and the like. In practice, local traveling environment surrounding the host vehicle may be built in advance based on data (i.e. traveling environment information) provided by the sensor, to provide basis for the subsequent lane-changing control.

Figure 6:
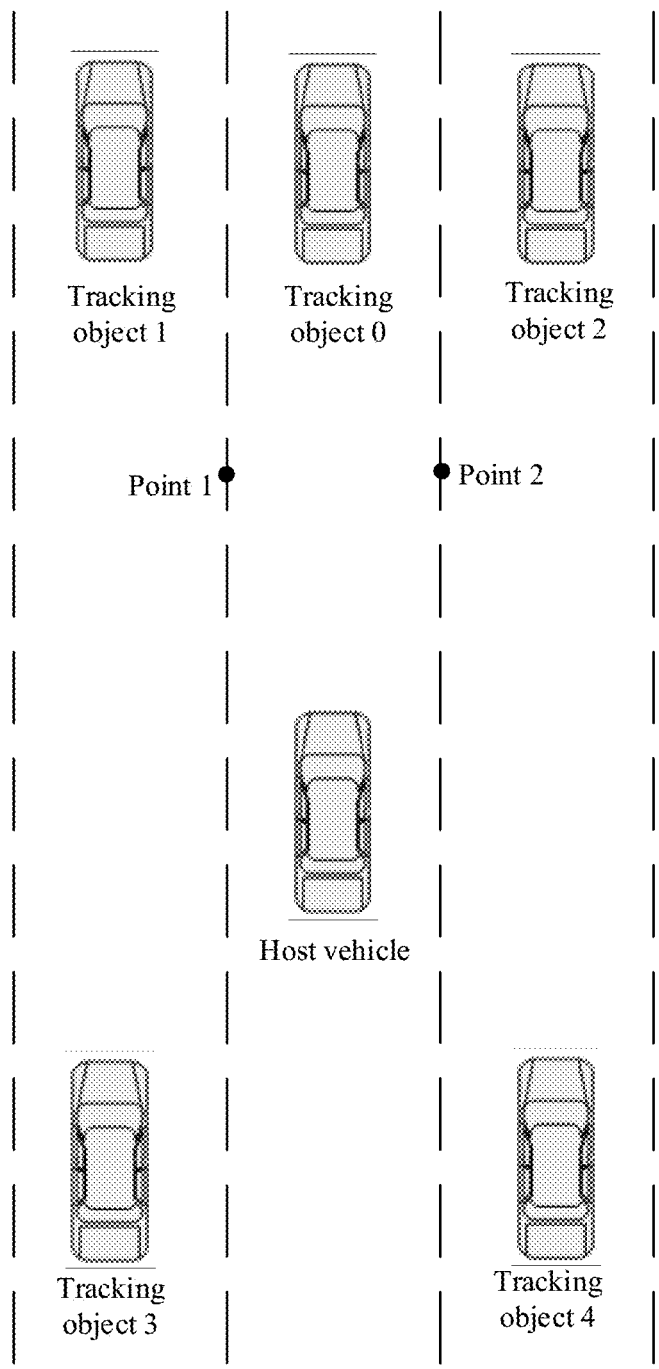
FIG. 6 is a schematic diagram illustrating a local traveling environment according to an embodiment of the present disclosure.

Reference is made to FIG. 6, which is a schematic diagram illustrating a local traveling environment including three lanes and five objects according to an embodiment of the present disclosure. The local traveling environment includes an traveling space and tracking objects. The traveling space includes a current lane where the host vehicle locates and candidate lanes at the left and right sides of the host vehicle for lane-changing. The tracking objects includes the obstacle (may be defined as a tracking object 0) in front of the host vehicle in the current lane where the host vehicle locates, the obstacle (may be defined as a tracking object 1) in front of the host vehicle and the obstacle (may be defined as a tracking object 3) behind the host vehicle in the left candidate lane, and the obstacle (may be defined as a tracking object 2) in front of the host vehicle and the obstacle (may be defined as a tracking object 4) behind the host vehicle in the right candidate lane.

In step S502, it is determined whether it is feasible for the host vehicle to change the lane where the host vehicle locates to a candidate lane based on the traveling environment information, and step S101 is executed in a case that it is feasible for the host vehicle to change the lane where the host vehicle locates to the candidate lane.

The candidate lane is a left neighboring lane or a right neighboring lane neighboring to the lane where the host vehicle locates.

In the embodiment of the present disclosure, the objects may be tracked and predicted based on the local traveling environment and the speed and the orientation of each object in the local traveling environment as shown in FIG. 6, to determine whether it is feasible for the host vehicle to change the lane where the host vehicle locates to the candidate lane. In a case that it is feasible for the host vehicle to change the lane to the left neighboring lane, the left neighboring lane has feasibility of lane-changing, and the to-be-turned-into lane is the left neighboring lane. In a case that it is feasible for the host vehicle to change the lane to the right neighboring lane, the right neighboring lane has feasibility of lane-changing, and the to-be-turned-into lane is the right neighboring lane.

It should be noted that, to conform to actual driving rules and driving habits, if both the left and right lanes of the host vehicle have the feasibility of lane-changing, it may be preferable to select the left lane as the to-be-turned-into lane if the host vehicle is a left rudder vehicle, and it may be preferable to select the right lane as the to-be-turned-into lane if the host vehicle is a right rudder vehicle.

Examples are made to illustrate how to determine the feasibility of lane-changing for the candidate lane in the following.

In the embodiment of the present disclosure, step S502 may be performed by determining whether it is feasible for the host vehicle to change the lane where the host vehicle locates to the candidate lane based on speeds of the host vehicle, a first tracking object and a second tracking object, and distances from the host vehicle to the first tracking object and the second tracking object. The first tracking object is an obstacle in front of the host vehicle in the candidate lane, and the second tracking object is an obstacle behind the host vehicle in the candidate lane. The first tracking object and the second tracking object may be vehicles, pedestrians, and obstacles that block normal traveling of the host vehicle.

It can be understood that, when determining the feasibility of changing the lane where the host vehicle locates to the left neighboring lane, the first tracking object and the second tracking object are the tracking object 1 and the tracking object 3 shown in FIG. 6 respectively. When determining the feasibility of changing the lane where the host vehicle locates to the right neighboring lane, the first tracking object and the second tracking object are the tracking object 2 and the tracking object 4 shown in FIG. 6 respectively.

Figure 7:
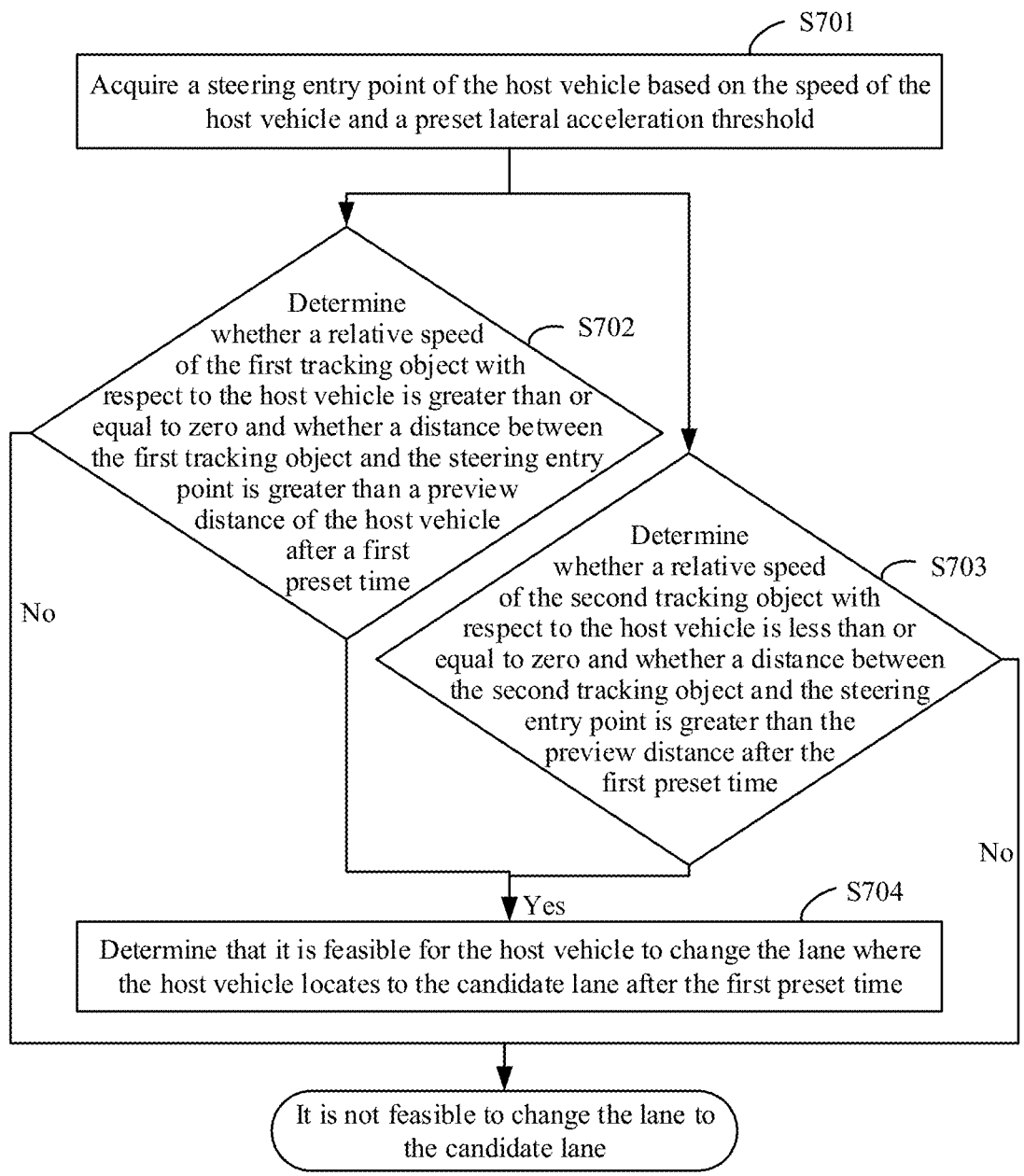
FIG. 7 is a schematic flow chart of determining the feasibility of lane-changing according to an embodiment of the present disclosure.

In some possible implementations of the embodiments of the present disclosure, as shown in FIG. 7, the determining whether it is feasible for the host vehicle to change the lane where the host vehicle locates to the candidate lane based on speeds of the host vehicle, a first tracking object and a second tracking object, and distances from the host vehicle to the first tracking object and the second tracking object includes the following steps S701 to S704.

In step S701, a steering entry point of the host vehicle is acquired based on the speed of the host vehicle and a preset lateral acceleration threshold. The steering entry point is located on a lane line between the host vehicle and the candidate lane.

In the embodiment of the present disclosure, the steering entry point is a point on the lane line that the host vehicle may pass through during lane-changing process obtained when predicting steering actions under the current speed and lateral acceleration threshold.

Assuming that the current speed of the host vehicle is $V_x$, the lateral acceleration threshold is $a_{lim}$, the radius R of a trajectory generated during the host vehicle changing the lane to a left lane or a right lane is $$R = \frac{V_x^2}{a_{lim}}.$$

An intersection point between a left lane-changing trajectory and a left lane line of the current lane is the steering entry point when changing the current lane to the left lane. An intersection point between a right lane-changing trajectory and a right lane line of the current lane is the steering entry point when changing the current lane to the right lane.

In step S702, it is determined whether a relative speed of the first tracking object with respect to the host vehicle is greater than or equal to zero and whether a distance between the first tracking object and the steering entry point is greater than a preview distance S of the host vehicle after a first preset time. The preview distance S is a distance travelled by the host vehicle during a preset steering preview time period. It is determined that a front lane-changing condition is met in a case that the relative speed of the first tracking object with respect to the host vehicle is greater than or equal to zero and the distance between the first tracking object and the steering entry point is greater than the preview distance S after the first preset time.

It can be understood that, the relative speed of the first tracking object with respect to the host vehicle is obtained by subtracting the speed of the host vehicle from the speed of the first tracking object. If the speed of the first tracking object is greater than or equal to the speed of the host vehicle, the relative speed of the first tracking object with respect to the host vehicle is greater than or equal to zero, and otherwise, the relative speed of the first tracking object with respect to the host vehicle is less than zero. The first preset time may be one second, three seconds or five seconds and so on. The preview distance S of the host vehicle is $S=V_x \times t_{set}$, where $t_{set}$ is the preset steering preview time period (for example 1.2 seconds). In other embodiments, the first preset time and the steering preview time period may be set according to actual situations, which are not described here.

Referring to FIG. 6 and taking a case in which the host vehicle steers left as an example, in this case, the steering entry point is point 1. If the relative speed of the tracking object 1 (i.e. the first tracking object) with respect to the host vehicle is greater than or equal to zero, and a distance between the tracking object 1 and the point 1 is greater than the preview distance S after one second, the left neighboring lane meets the front lane-changing condition after one second.

In step S703, it is determined whether a relative speed of the second tracking object with respect to the host vehicle is less than or equal to zero and whether a distance between the second tracking object and the steering entry point is greater than the preview distance after the first preset time. It is determined that a back lane-changing condition is met in a case that the relative speed of the second tracking object with respect to the host vehicle is less than or equal to zero and the distance between the second tracking object and the steering entry point is greater than the preview distance after the first preset time.

Similarly, the relative speed of the second tracking object with respect to the host vehicle is obtained by subtracting the speed of the host vehicle from the speed of the second tracking object. If the speed of the second tracking object is less than or equal to the speed of the host vehicle, the relative speed of the second tracking object with respect to the host vehicle is less than or equal to zero, and otherwise, the relative speed of the second tracking object with respect to the host vehicle is greater than zero.

Referring to FIG. 6 and taking a case in which the host vehicle steers left as an example, in this case, the steering entry point is point 1. If the relative speed of the tracking object 3 (i.e. the second tracking object) with respect to the host vehicle is less than or equal to zero, and a distance between the tracking object 3 and the point 1 is greater than the preview distance S after one second, the left neighboring lane meets the back lane-changing condition after one second.

It can be understood that, execution sequence of step S702 and step S703 is not limited by the embodiment of the present disclosure. In other embodiments, the execution sequence of step S702 and step S703 may be set according to actual situations. Step S702 and step S703 may be executed sequentially or in parallel, which is not described here.

In step S704, it is determined that it is feasible for the host vehicle to change the lane where the host vehicle locates to the candidate lane after the first preset time in a case that both the front lane-changing condition and the back lane-changing condition are met.

In the embodiment, in a case that both the front lane-changing condition and the back lane-changing condition are met, the vehicles in front of the host vehicle and behind the host vehicle in the candidate lane may not block the traveling of the host vehicle during lane-changing process. And the lane-changing is feasible, and the host vehicle may be controlled to change the lane to the candidate lane.

Figure 8:
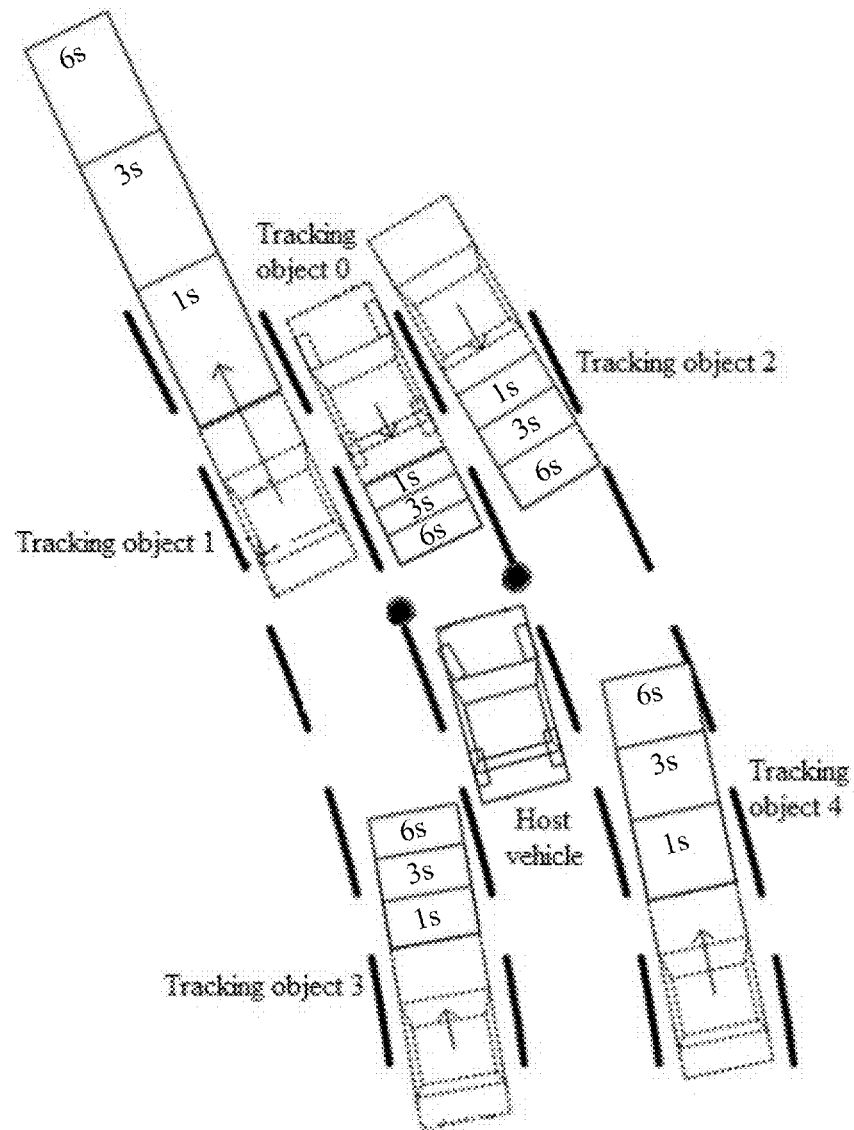
FIG. 8 is a schematic diagram illustrating estimation of locations of tracking objects according to an embodiment of the present disclosure.

In practice, locations of each tracking object in the local traveling environment may be predicted firstly, to estimate relative location of the tracking object with respect to the host vehicle after different time intervals (i.e. the first preset time), and tracking object location estimation is obtained, as shown in FIG. 8. Based on the tracking object location estimation, it is determined whether the lane-changing feasibility conditions, that is, the front lane-changing condition and the back lane-changing condition, are met based on the location of the steering entry point and locations and relative speeds of the obstacles in front of the steering entry point and behind the steering entry point.

Currently, the lane-changing control is generally triggered by a driver based on the driver's judgment on moving situations of the front vehicle, then the steering lamp is turned on to prompt the system to start lane-changing operation. Thus, the triggering of lane-changing control requires human participation, which resulting in poor autonomy. In view of this, in embodiments of the present disclosure, the necessity of lane-changing is determined to determine whether it is necessary for the host vehicle to change the lane, and the lane-changing control is trigged when it is determined that it is necessary for the host vehicle to change the lane.

After step S501, the method further includes performing at least one of determining operations including: determining whether it is necessary for the host vehicle to change the lane where the host vehicle locates based on a global path planning, where the global path planning includes lane end recognition and navigation path recognition; and determining whether the traveling environment information meets a preset vehicle following condition. Step S101 is executed in a case that it is feasible for the host vehicle to change the lane where the host vehicle locates to the candidate lane and at least one of following two cases occurs, the two cases includes one case that it is necessary for the host vehicle to change the lane where the host vehicle locates and the other case that the traveling environment information does not meet the preset vehicle following condition.

In one embodiment, the host vehicle may keep traveling in the current lane and follow the vehicle in front of the host vehicle. The lane-changing is triggered when one of the following three cases occurs. In a first case, the host vehicle travels to the end of the current lane. In a second case, the current lane does not meet the requirement of the global path planning (such as steering/going straight, speed-limiting). In a third case, the state (such as the speed, the vehicle model) of the vehicle in front of the host vehicle does not meet the vehicle following condition.

The first case and the second case correspond to the operation of determining whether it is necessary for the host vehicle to change the lane where the host vehicle locates based on a global path planning, the determining may be based on lane line recognition, a map system, a navigation system or the like. The third case corresponds to the operation of determining whether the traveling environment information meets a preset vehicle following condition, the determining may be based on local environmental sensing. In a case that one of the three cases occurs, it is determined that it is necessary for the host vehicle to change the lane where the host vehicle locates.

In some possible implementations of the embodiment of the present disclosure, there may be at least following three possible ways to realize the operation of determining whether the traveling environment information meets the preset vehicle following condition.

In a first possible way, the determining whether the traveling environment information meets a preset vehicle following condition may include: determining whether a speed $V_{front}$ of a third tracking object is less than a preset speed $V_{max}$ and whether a difference between the speed $V_{front}$ of the third tracking object and the preset speed $V_{max}$ is greater than or equal to a preset speed difference threshold $V_{TH}$; and determining that the traveling environment information does not meet the vehicle following condition in a case that the speed $V_{front}$ of the third tracking object is less than the preset speed $V_{max}$ and the difference between the speed $V_{front}$ of the third tracking object and the preset speed $V_{max}$ is greater than or equal to the preset speed difference threshold $V_{TH}$.

The third tracking object is an obstacle in front of the host vehicle in the same lane as the host vehicle, that is, the tracking object 0 shown in FIG. 6.

In this case, the vehicle in front of the host vehicle in the current lane does not meet a vehicle following condition for speed, and the vehicle following speed of the host vehicle is too low. The preset speed $V_{max}$ may be a maximum traveling speed set in advance, and may be determined based on the actual road situation. The preset speed difference threshold $V_{TH}$ is low-speed limitation. In a case of $V_{max}-V_{front} \geq V_{TH}$, the vehicle following condition is not met, and the host vehicle may need to change the lane.

In a second possible way, the determining whether the traveling environment information meets a preset vehicle following condition may include: determining whether a rest time period $t_1$ in which the host vehicle does not move is greater than or equal to a preset first waiting time period $T_1$ in a case that both the speed of the host vehicle and a speed of a third tracking object are zero; and determining that the traveling environment information does not meet the vehicle following condition in a case that the rest time period $t_1$ is greater than or equal to the preset first waiting time period $T_1$.

In this case, the vehicle in front of the host vehicle in the current lane does not meet a vehicle following condition for time, and the rest time period is too long. The first waiting time period $T_1$ is a preset waiting time limit. The rest time period $t_1$ is obtained by timing when the host vehicle follows the third tracking object and stops moving. In a case of $t_1 \geq T_1$, the vehicle following condition is not met, and the host vehicle may need to change the lane.

In a third possible way, the determining whether the traveling environment information meets a preset vehicle following condition may include: determining whether a speed $V_{front}$ of a third tracking object is less than a preset speed $V_{max}$ and whether a difference between the speed $V_{front}$ of the third tracking object and the preset speed $V_{max}$ is greater than or equal to a preset speed difference threshold $V_{TH}$; counting a duration time period $t_2$ in which the difference between the speed $V_{front}$ of the third tracking object and the preset speed $V_{max}$ is greater than or equal to the preset speed difference threshold $V_{TH}$ in a case that the speed $V_{front}$ of the third tracking object is less than the preset speed $V_{max}$ and the difference between the speed $V_{front}$ of the third tracking object and the preset speed $V_{max}$ is greater than or equal to the preset speed difference threshold $V_{TH}$; and determining that the traveling environment information does not meet the vehicle following condition in a case that the duration time period $t_2$ is greater than a preset second waiting time period $T_2$.

In this case, the vehicle in front of the host vehicle in the current lane does not meet a vehicle following condition for combination of speed and time, and the host vehicle travels at a low speed for a too long time period. The second waiting time period $T_2$ is a preset low-speed traveling time limit. In a case of $V_{max}-V_{front} \geq V_{TH}$, timing is began to obtain the duration time period $t_2$. In a case of $t_2 \geq T_2$, the vehicle following condition is not met, and the host vehicle may need to change the lane.

It can be understood that, in practice, it is determined whether it is necessary for the host vehicle to change the lane, that is, the necessity of lane-changing, is determined firstly. In a case that it is necessary for the host vehicle to change the lane, it is determined whether it is feasible for the host vehicle to change the lane to the candidate lane, that is, the feasibility of lane-changing is determined. In the embodiments of the present disclosure, the execution sequence of the two determining operations are not limited, and may set the execution sequence of the two determining operations according to actual situations, which are not described here.

Currently, the lane-changing control is generally triggered by a driver based on the driver's judgment on moving situations of the front vehicle, then the steering lamp is turned on to prompt the system to start lane-changing operation, therefore, the triggering of lane-changing control requires human participation, which resulting in poor autonomy. In other current solutions, the triggering of lane-changing control is based on determination on the feasibility of lane-changing. By determining whether there is an object in side environment impacting lane-changing through a side sensor, the feasibility of lane-changing is determined based on the occurrence of the object. However, the detected objects are not divided and selected, thus algorithms for realizing object tracking and trajectory estimation are complex. In the embodiment of the present disclosure, before controlling the host vehicle to change a lane, the traveling environment information on the surrounding environment of the host vehicle is acquired first, and it is determined whether the preset lane-changing condition is met based on the traveling environment information. The preset lane-changing condition includes whether it is necessary to change a lane and whether it is feasible to change a lane, that is, the necessity and feasibility of lane-changing. The necessity of lane-changing is determined based on combination of a speed threshold and a vehicle following time threshold and the like, the necessities of lane-changing under different conditions are different. The feasibility of lane-changing is determined by modeling a three-lane five-object local environment and tracking and predicting motion of an object in the local environment model, and a safe lane-changing space is ensured. When the preset lane-changing conditions are satisfied, the host vehicle is controlled to perform lane-changing, and the lane-changing control is triggered by triggering conditions of the necessity and feasibility instead of lane-changing actions triggered by a person. The lane-changing control method may be implemented by only performing preset actions without complex lane-changing algorithms, and the lane-changing control method applied in the actual lane-changing process is simplified.

Based on the vehicle lane-changing control method provided by the above embodiments of the present disclosure, a vehicle lane-changing control device is also provided by embodiments of the present disclosure.

Figure 9:
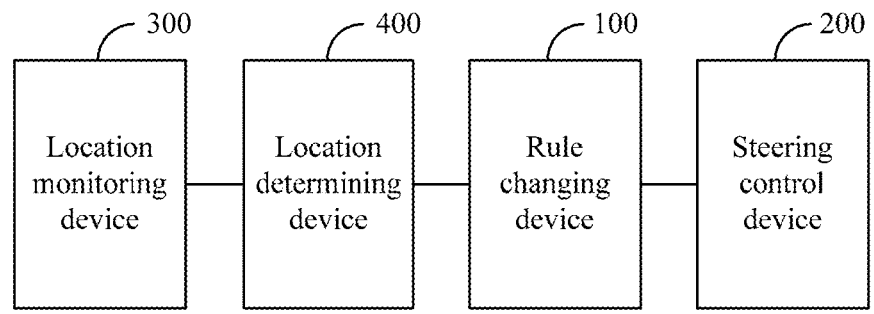
FIG. 9 is a schematic structural diagram of a vehicle lane-changing control device according to an embodiment of the present disclosure.

Reference is made to FIG. 9, which is a schematic structural diagram of a vehicle lane-changing control device according to an embodiment of the present disclosure. The vehicle lane-changing control device according to an embodiment of the present disclosure includes a rule changing device 100, a steering control device 200, a location monitoring device 300 and a location determining device 400.

The rule changing device 100 is configured to: send a first control rule to the steering control device 200; and send a second control rule corresponding to a preset changing rule to the steering control device 200 in a case that a location determining device 400 determines that a location relation between a host vehicle and a referential lane line meets the preset changing rule. The referential lane line is located between the host vehicle and a to-be-turned-into lane.

The steering control device 200 is configured to: control the host vehicle to travel into a neighboring to-be-turned-into lane with the first control rule sent by the rule changing device; and control the host vehicle to travel into the neighboring to-be-turned-into lane with the second control rule sent by the rule changing device.

The location monitoring device 300 is configured to acquire the location relation between the host vehicle and the referential lane line in a real time manner.

The location determining device 400 is configured to determine whether the location relation meets the preset changing rule.

In some possible implementations of the embodiments of the present disclosure, the location determining device 400 is configured to: determine that the location relation meets the preset changing rule in a case that front wheels of the host vehicle all cross the referential lane line; or determine that the location relation meets the preset changing rule in a case that the host vehicle totally travels into the to-be-turned-into lane and an angle between a course of the host vehicle and the referential lane line is less than a preset angle threshold.

As an example, the rule changing device 100 is configured to: acquire a speed of the host vehicle; and determine a lane-changing rule corresponding to the speed. The lane-changing rule is determined in advance based on a lane-changing operation actually performed when the host vehicle is drove by a driver at the speed and a lane-changing environment, and the lane-changing rule includes the first control rule and the second control rule.

It should be note that, the lane-changing rule includes a steering wheel steering angle threshold and a steering wheel steering angular velocity; or the lane-changing rule includes a steering wheel steering angle threshold, a steering wheel steering angular velocity and a steering wheel steering angle hold time.

According to embodiments of the present disclosure, during the process of controlling the host vehicle to change a lane, the host vehicle is firstly controlled to travel into the neighboring to-be-turned-into lane with the first control rule, the location relation between the host vehicle and the referential lane line located between the host vehicle and the to-be-turned-into lane is acquired in a real time manner, and it is determined whether the location relation meets the preset changing rule. In a case that the location relation meets the preset changing rule, the control rule for controlling the host vehicle is changed to the second control rule corresponding to the preset changing rule, thus an actual lane-changing control rule for the host vehicle is combined with postures of the host vehicle in and between the lanes. Based on the relation between the actual location of the host vehicle and the location of the referential lane line, the lane-changing control rule is changed to control lane-changing actions performed by the host vehicle. It is ensured that, the steering control on the host vehicle during the lane-changing process conforms to the actual road situation, and lane-changing results that are more accurate and more in line with the actual situations are obtained without planning for a virtual lane-changing trajectory in advance. In addition, during the controlling process, it is unnecessary to plan for a virtual lane-changing trajectory in advance, and complex control algorithms and control flows needed for changing a lane along the lane-changing trajectory are abandoned, thereby decreasing the complexity of algorithms and flows and reducing the system overhead while ensuring the accuracy of lane-changing results.

Figure 10:
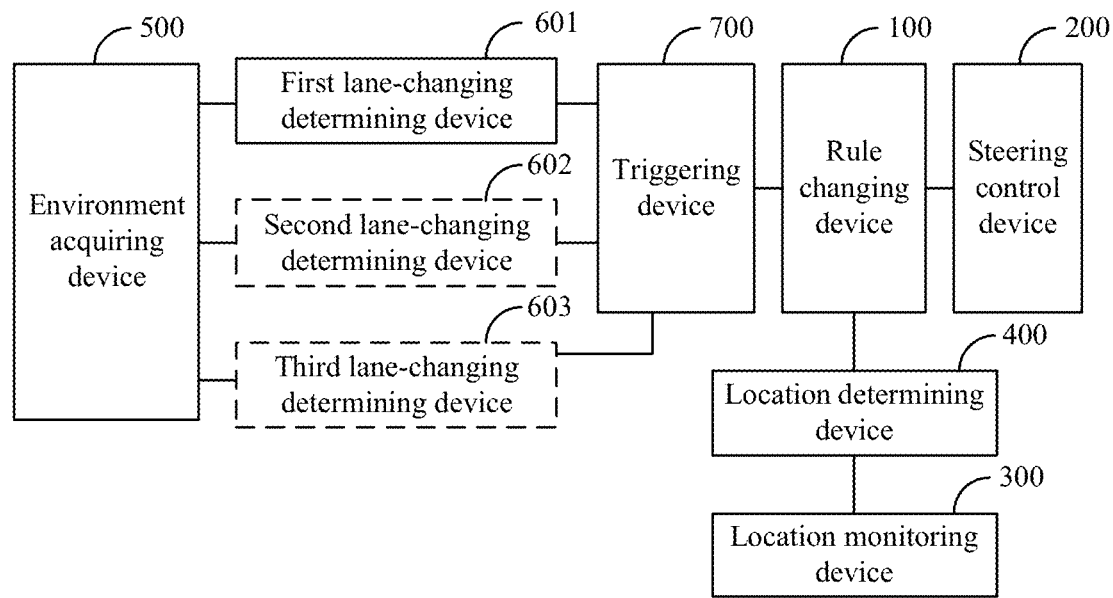
FIG. 10 is a schematic structural diagram of a vehicle lane-changing control device according to an embodiment of the present disclosure.

Reference is made to FIG. 10, which is a schematic structural diagram of a vehicle lane-changing control device according to an embodiment of the present disclosure. Compared with FIG. 9, a more specific vehicle lane-changing control device is provided according to the embodiment shown in FIG. 10. Based on FIG. 9, the vehicle lane-changing control device according to this embodiment of the present disclosure further includes an environment acquiring device 500, a first lane-changing determining device 601 and a triggering device 700.

The environment acquiring device 500 is configured to acquire traveling environment information on a surrounding environment of the host vehicle. The traveling environment information includes a speed of the host vehicle and a speed and an orientation of an obstacle in the same lane as the host vehicle and in a neighboring lane neighboring to the lane where the host vehicle locates.

The first lane-changing determining device 601 is configured to determine whether it is feasible for the host vehicle to change the lane where the host vehicle locates to a candidate lane based on the traveling environment information. The candidate lane is a left neighboring lane or a right neighboring lane neighboring to the lane where the host vehicle locates.

The triggering device 700 is configured to trigger to execute the rule changing device 100 in a case that the first lane-changing determining device 601 determines that it is feasible for the host vehicle to change the lane where the host vehicle locates to the candidate lane.

In some possible implementations of the embodiment of the present disclosure, the first lane-changing determining device 601 is configured to: determine whether it is feasible for the host vehicle to change the lane where the host vehicle locates to the candidate lane based on speeds of the host vehicle, a first tracking object and a second tracking object, and distances from the host vehicle to the first tracking object and the second tracking object. The first tracking object is an obstacle in front of the host vehicle in the candidate lane, and the second tracking object is an obstacle behind the host vehicle in the candidate lane.

As an example, the first lane-changing determining device 601 includes an acquiring sub-device, a first determining sub-device, a second determining sub-device and a result determining sub-device.

The acquiring sub-device is configured to acquire a steering entry point of the host vehicle based on the speed of the host vehicle and a preset lateral acceleration threshold. The steering entry point is located on a lane line between the host vehicle and the candidate lane.

The first determining sub-device is configured to determine whether a relative speed of the first tracking object with respect to the host vehicle is greater than or equal to zero and whether a distance between the first tracking object and the steering entry point is greater than a preview distance of the host vehicle after a first preset time. The preview distance is a distance travelled by the host vehicle during a preset steering preview time period.

The second determining sub-device is configured to determine whether a relative speed of the second tracking object with respect to the host vehicle is less than or equal to zero and whether a distance between the second tracking object and the steering entry point is greater than the preview distance after the first preset time.

The result determining sub-device is configured to: determine that a front lane-changing condition is met in a case that the first determining sub-device determines that the relative speed of the first tracking object with respect to the host vehicle is greater than or equal to zero and the distance between the first tracking object and the steering entry point is greater than the preview distance after the first preset time; determine that a back lane-changing condition is met in a case that the second determining sub-device determines that the relative speed of the second tracking object with respect to the host vehicle is less than or equal to zero and the distance between the second tracking object and the steering entry point is greater than the preview distance after the first preset time; and determine that it is feasible for the host vehicle to change the lane where the host vehicle locates to the candidate lane after the first preset time in a case that both the front lane-changing condition and the back lane-changing condition are met.

In some possible implementations of the embodiment of the present disclosure, the vehicle lane-changing control device further includes a second lane-changing determining device 602 and/or a third lane-changing determining device 603.

The second lane-changing determining device 602 is configured to determine whether it is necessary for the host vehicle to change the lane where the host vehicle locates based on a global path planning. The global path planning includes lane end recognition and navigation path recognition.

The third lane-changing determining device 603 is configured to determine whether the traveling environment information meets a preset vehicle following condition.

The triggering device 700 is configured to trigger to execute the rule changing device 100 in a case that the first lane-changing determining device 601 determines that it is feasible for the host vehicle to change the lane where the host vehicle locates to the candidate lane and at least one of following two cases occurs, the two cases includes one case that the second lane-changing determining device 602 determines that it is necessary for the host vehicle to change the lane where the host vehicle locates and the other case that the third lane-changing determining device 603 determines that the traveling environment information does not meet the preset vehicle following condition.

In practice, the third lane-changing determining device 603 has at least the following three implementation ways.

In a first implementation way, the third lane-changing determining device 603 is configured to: determine whether a speed of a third tracking object is less than a preset speed and whether a difference between the speed of the third tracking object and the preset speed is greater than or equal to a preset speed difference threshold; and determine that the traveling environment information does not meet the vehicle following condition in a case that the speed of the third tracking object is less than the preset speed and the difference between the speed of the third tracking object and the preset speed is greater than or equal to the preset speed difference threshold. The third tracking object is an obstacle in front of the host vehicle in the same lane as the host vehicle.

In a second implementation way, the third lane-changing determining device 603 is configured to: determine whether a rest time period in which the host vehicle does not move is greater than or equal to a preset first waiting time period in a case that both the speed of the host vehicle and a speed of a third tracking object are zero; and determine that the traveling environment information does not meet the vehicle following condition in a case that the rest time period of the host vehicle is greater than or equal to the preset first waiting time period.

In a third implementation way, the third lane-changing determining device 603 is configured to: determine whether a speed of a third tracking object is less than a preset speed and whether a difference between the speed of the third tracking object and the preset speed is greater than or equal to a preset speed difference threshold; count a duration time period in which the difference between the speed of the third tracking object and the preset speed is greater than or equal to the preset speed difference threshold in a case that the speed of the third tracking object is less than the preset speed and the difference between the speed of the third tracking object and the preset speed is greater than or equal to the preset speed difference threshold; and determine that the traveling environment information does not meet the vehicle following condition in a case that the duration time period is greater than a preset second waiting time period.

In the embodiment of the present disclosure, before controlling the host vehicle to change a lane, the traveling environment information on the surrounding environment of the host vehicle is acquired first, and it is determined whether the preset lane-changing condition is met based on the traveling environment information. The preset lane-changing condition includes whether it is necessary to change a lane and whether it is feasible to change a lane, that is, the necessity and feasibility of lane-changing. The necessity of lane-changing is determined based on combination of a speed threshold and a vehicle following time threshold and the like, the necessities of lane-changing under different conditions are different. The feasibility of lane-changing is determined by modeling a three-lane five-object local environment and tracking and predicting motion of an object in the local environment model, and a safe lane-changing space is ensured. When the preset lane-changing conditions are satisfied, the host vehicle is controlled to perform lane-changing, and the lane-changing control is triggered by triggering conditions of the necessity and feasibility instead of lane-changing actions triggered by a person. The lane-changing control method may be implemented by only performing preset actions without complex lane-changing algorithms, and the lane-changing control method applied in the actual lane-changing process is simplified.

Based on the vehicle lane-changing control method and the vehicle lane-changing control device provided by the above embodiments, a computer readable storage medium is also provided by embodiments of the present disclosure. The computer readable storage medium is stored with computer programs, and the computer programs, when executed by a processor, cause the processor to perform the vehicle lane-changing control method described in the above embodiments.

Based on the vehicle lane-changing control method and the vehicle lane-changing control device provided by the above embodiments, a vehicle controller is also provided by embodiments of the present disclosure. The vehicle controller includes: a memory and a processor. The memory is configured to store program codes and transmit the program codes to the processor. The processor is configured to perform, according to instructions in the program codes stored in the memory, the vehicle lane-changing control method described in the above embodiments.

It should be noted that, the embodiments of the disclosure are described in a progressive way, and each embodiment emphasizes the differences from other embodiments, and the same or similar contents of the embodiments may be referred to each other. Since the device or related equipment disclosed by the embodiments corresponds to the method disclosed by the embodiments, the description of the device or related equipment is brief, and for relevant matters references may be made to the description of the method.

It also should be noted that, a relationship term such as "the first" and "the second" herein is only used to distinguish one entity or operation from another entity or operation, and does not necessarily require or imply that there is an actual relationship or sequence between these entities or operations. Furthermore, terms "include", "comprise" or any other variations are intended to cover non-exclusive "include", so that a process, a method, an object or a device including a series of factors not only include the factors, but also include other factors not explicitly listed, or also include inherent factors of the process, the method, the object or the device. Without more limitation, a factor defined in a sentence "include one . . . " does not exclude a case that there is also another same factor in the process, the method, the object or the device including the described factor.

Steps of the method or algorithm described in conjunction with the embodiments disclosed herein may be implemented directly with hardware, a software device executed by a processor, or a combination thereof. The software device may be placed in a Random Access Memory (RAM), a memory, a Read Only Memory (ROM), an electrically-programmable ROM, an electrically erasable programmable ROM, a register, a hard disk, a removable disk, a CD-ROM, or a storage medium in any other forms well known in the art.

The invention claimed is:

1. A vehicle lane-changing control method, comprising:
controlling a host vehicle to travel into a neighboring to-be-turned-into lane with a first control rule;
acquiring a location relation between the host vehicle and a referential lane line in real time, wherein the referential lane line is located between the host vehicle and the to-be-turned-into lane, wherein the location relation comprises one or more of following situations: the host vehicle has not yet crossed the referential lane line, a front wheel of the host vehicle hits the referential lane line, a front wheel of the host vehicle totally crosses the referential lane line, a rear wheel of the host vehicle totally crosses the referential lane line, and the host vehicle travels parallel to the referential lane line;
determining whether the location relation meets a preset changing rule; and
controlling an action of the host vehicle with a second control rule corresponding to the preset changing rule in a case that the location relation meets the preset changing rule, wherein
lane-changing rules applied during lane-changing control are determined by actual lane-changing operations of a driver, and the lane-changing rules are divided based on lane-changing environment and the preset changing rule to acquire the first control rule and the second control rule,
wherein before the controlling a host vehicle to travel into a neighboring to-be-turned-into lane with a first control rule, the method further comprises:
acquiring traveling environment information on a surrounding environment of the host vehicle, wherein the traveling environment information comprises a speed of the host vehicle and a speed and an orientation of an obstacle in the same lane as the host vehicle and in a neighboring lane neighboring to the lane where the host vehicle locates; and
determining whether it is feasible for the host vehicle to change the lane where the host vehicle locates to a candidate lane based on the traveling environment information, wherein the candidate lane is a left neighboring lane or a right neighboring lane neighboring to the lane where the host vehicle locates; wherein
the host vehicle is controlled to travel into the neighboring to-be-turned-into lane with the first control rule in a case that it is feasible for the host vehicle to change the lane where the host vehicle locates to the candidate lane,
wherein the determining whether it is feasible for the host vehicle to change the lane where the host vehicle locates to a candidate lane comprises:
determining whether it is feasible for the host vehicle to change the lane where the host vehicle locates to the candidate lane based on speeds of the host vehicle, a first tracking object and a second tracking object, and distances from the host vehicle to the first tracking object and the second tracking object, wherein the first tracking object is an obstacle in front of the host vehicle in the candidate lane, and the second tracking object is an obstacle behind the host vehicle in the candidate lane, wherein the determining whether it is feasible for the host vehicle to change the lane where the host vehicle locates to the candidate lane based on speeds of the host vehicle, a first tracking object and a second tracking object, and distances from the host vehicle to the first tracking object and the second tracking object comprises:

acquiring a steering entry point of the host vehicle based on the speed of the host vehicle and a preset lateral acceleration threshold, wherein the steering entry point is located on a lane line between the host vehicle and the candidate lane;

determining whether a relative speed of the first tracking object with respect to the host vehicle is greater than or equal to zero and whether a distance between the first tracking object and the steering entry point is greater than a preview distance of the host vehicle after a first preset time, wherein the preview distance is a distance travelled by the host vehicle during a preset steering preview time period; and determining that a front lane-changing condition is met in a case that the relative speed of the first tracking object with respect to the host vehicle is greater than or equal to zero and the distance between the first tracking object and the steering entry point is greater than the preview distance after the first preset time;

determining whether a relative speed of the second tracking object with respect to the host vehicle is less than or equal to zero and whether a distance between the second tracking object and the steering entry point is greater than the preview distance after the first preset time; and determining that a back lane-changing condition is met in a case that the relative speed of the second tracking object with respect to the host vehicle is less than or equal to zero and the distance between the second tracking object and the steering entry point is greater than the preview distance after the first preset time; and determining that it is feasible for the host vehicle to change the lane where the host vehicle locates to the candidate lane after the first preset time in a case that both the front lane-changing condition and the back lane-changing condition are met.

2. The vehicle lane-changing control method according to claim 1, wherein the determining whether the location relation meets a preset changing rule comprises:

determining that the location relation meets the preset changing rule in a case that front wheels of the host vehicle all cross the referential lane line; or determining that the location relation meets the preset changing rule in a case that the host vehicle totally travels into the to-be-turned-into lane and an angle between a course of the host vehicle and the referential lane line is less than a preset angle threshold.

3. The vehicle lane-changing control method according to claim 2, wherein determining the first control rule and the second control rule comprises:

acquiring a speed of the host vehicle; and determining a lane-changing rule corresponding to the speed, wherein the lane-changing rule is determined in advance based on a lane-changing operation actually performed when the host vehicle is drove by a driver at the speed and a lane-changing environment, and the lane-changing rule comprises the first control rule and the second control rule.

4. The vehicle lane-changing control method according to claim 3, wherein the lane-changing rule comprises a steering wheel steering angle threshold and a steering wheel steering angular velocity; or the lane-changing rule comprises a steering wheel steering angle threshold, a steering wheel steering angular velocity and a steering wheel steering angle hold time.

5. The vehicle lane-changing control method according to claim 1, wherein after the acquiring traveling environment information on a surrounding environment of the host vehicle, the method further comprises performing at least one of determining operations comprising:

determining whether it is necessary for the host vehicle to change the lane where the host vehicle locates based on a global path planning, wherein the global path planning comprises lane end recognition and navigation path recognition; and determining whether the traveling environment information meets a preset vehicle following condition; wherein the host vehicle is controlled to travel into the neighboring to-be-turned-into lane with the first control rule in a case that it is feasible for the host vehicle to change the lane where the host vehicle locates to the candidate lane and at least one of following two cases occurs, the two cases comprises one case that it is necessary for the host vehicle to change the lane where the host vehicle locates and the other case that the traveling environment information does not meet the preset vehicle following condition.

6. The vehicle lane-changing control method according to claim 5, wherein the determining whether the traveling environment information meets a preset vehicle following condition comprises:

determining whether a speed of a third tracking object is less than a preset speed and whether a difference between the speed of the third tracking object and the preset speed is greater than or equal to a preset speed difference threshold; and determining that the traveling environment information does not meet the vehicle following condition in a case that the speed of the third tracking object is less than the preset speed and the difference between the speed of the third tracking object and the preset speed is greater than or equal to the preset speed difference threshold, wherein the third tracking object is an obstacle in front of the host vehicle in the same lane as the host vehicle; or determining whether a rest time period in which the host vehicle does not move is greater than or equal to a preset first waiting time period in a case that both the speed of the host vehicle and a speed of a third tracking object are zero; and determining that the traveling environment information does not meet the vehicle following condition in a case that the rest time period of the host vehicle is greater than or equal to the preset first waiting time period; or determining whether a speed of a third tracking object is less than a preset speed and whether a difference between the speed of the third tracking object and the preset speed is greater than or equal to a preset speed difference threshold; counting a duration time period in which the difference between the speed of the third tracking object and the preset speed is greater than or equal to the preset speed difference threshold in a case that the speed of the third tracking object is less than the preset speed and the difference between the speed of the third tracking object and the preset speed is greater than or equal to the preset speed difference threshold; and determining that the traveling environment information does not meet the vehicle following condition in a case that the duration time period is greater than a preset second waiting time period.

7. A vehicle lane-changing control device, comprising a processor and a memory for storing program instructions, wherein the processor executes the program instructions to:

control a host vehicle to travel into a neighboring to-be-turned-into lane with a first control rule;

acquire a location relation between the host vehicle and a referential lane line in real time, wherein the referential lane line is located between the host vehicle and the to-be-turned-into lane, wherein the location relation comprises one or more of following situations: the host vehicle has not yet crossed the referential lane line, a front wheel of the host vehicle hits the referential lane line, a front wheel of the host vehicle totally crosses the referential lane line, a rear wheel of the host vehicle totally crosses the referential lane line, and the host vehicle travels parallel to the referential lane line;

determine whether the location relation meets a preset changing rule; and control an action of the host vehicle with a second control rule corresponding to the preset changing rule in a case that the location relation meets the preset changing rule, wherein lane-changing rules applied during lane-changing control are determined by actual lane-changing operations of a driver, and the lane-changing rules are divided based on lane-changing environment and the preset changing rule to acquire the first control rule and the second control rule, wherein before controlling a host vehicle to travel into a neighboring to-be-turned-into lane with a first control rule, the processor executes the program instructions further to:

acquire traveling environment information on a surrounding environment of the host vehicle, wherein the traveling environment information comprises a speed of the host vehicle and a speed and an orientation of an obstacle in the same lane as the host vehicle and in a neighboring lane neighboring to the lane where the host vehicle locates; and determine whether it is feasible for the host vehicle to change the lane where the host vehicle locates to a candidate lane based on the traveling environment information, wherein the candidate lane is a left neighboring lane or a right neighboring lane neighboring to the lane where the host vehicle locates; wherein the host vehicle is controlled to travel into the neighboring to-be-turned-into lane with the first control rule in a case that it is feasible for the host vehicle to change the lane where the host vehicle locates to the candidate lane, wherein the processor executes the program instructions further to:

determine whether it is feasible for the host vehicle to change the lane where the host vehicle locates to the candidate lane based on speeds of the host vehicle, a first tracking object and a second tracking object, and distances from the host vehicle to the first tracking object and the second tracking object, wherein the first tracking object is an obstacle in front of the host vehicle in the candidate lane, and the second tracking object is an obstacle behind the host vehicle in the candidate lane, wherein the processor executes the program instructions further to:

acquire a steering entry point of the host vehicle based on the speed of the host vehicle and a preset lateral acceleration threshold, wherein the steering entry point is located on a lane line between the host vehicle and the candidate lane;

determine whether a relative speed of the first tracking object with respect to the host vehicle is greater than or equal to zero and whether a distance between the first tracking object and the steering entry point is greater than a preview distance of the host vehicle after a first preset time, wherein the preview distance is a distance travelled by the host vehicle during a preset steering preview time period; and determining that a front lane-changing condition is met in a case that the relative speed of the first tracking object with respect to the host vehicle is greater than or equal to zero and the distance between the first tracking object and the steering entry point is greater than the preview distance after the first preset time;

determine whether a relative speed of the second tracking object with respect to the host vehicle is less than or equal to zero and whether a distance between the second tracking object and the steering entry point is greater than the preview distance after the first preset time; and determining that a back lane-changing condition is met in a case that the relative speed of the second tracking object with respect to the host vehicle is less than or equal to zero and the distance between the second tracking object and the steering entry point is greater than the preview distance after the first preset time; and determine that it is feasible for the host vehicle to change the lane where the host vehicle locates to the candidate lane after the first preset time in a case that both the front lane-changing condition and the back lane-changing condition are met.

8. The vehicle lane-changing control device according to claim 7, wherein the processor executes the program instructions further to:

determine that the location relation meets the preset changing rule in a case that front wheels of the host vehicle all cross the referential lane line; or determine that the location relation meets the preset changing rule in a case that the host vehicle totally travels into the to-be-turned-into lane and an angle between a course of the host vehicle and the referential lane line is less than a preset angle threshold.

9. The vehicle lane-changing control device according to claim 8, wherein the processor executes the program instructions further to:

acquire a speed of the host vehicle; and determine a lane-changing rule corresponding to the speed, wherein the lane-changing rule is determined in advance based on a lane-changing operation actually performed when the host vehicle is drove by a driver at the speed and a lane-changing environment, and the lane-changing rule comprises the first control rule and the second control rule.

10. The vehicle lane-changing control device according to claim 9, wherein
the lane-changing rule comprises a steering wheel steering angle threshold and a steering wheel steering angular velocity; or
the lane-changing rule comprises a steering wheel steering angle threshold, a steering wheel steering angular velocity and a steering wheel steering angle hold time.

11. The vehicle lane-changing control device according to claim 7, wherein after acquiring traveling environment information on a surrounding environment of the host vehicle, the processor executes the program instructions further to perform at least one of determining operations comprising:
determining whether it is necessary for the host vehicle to change the lane where the host vehicle locates based on a global path planning, wherein the global path planning comprises lane end recognition and navigation path recognition; and
determining whether the traveling environment information meets a preset vehicle following condition; wherein
the host vehicle is controlled to travel into the neighboring to-be-turned-into lane with the first control rule in a case that it is feasible for the host vehicle to change the lane where the host vehicle locates to the candidate lane and at least one of following two cases occurs, the two cases comprises one case that it is necessary for the host vehicle to change the lane where the host vehicle locates and the other case that the traveling environment information does not meet the preset vehicle following condition.

12. The vehicle lane-changing control device according to claim 11, wherein the processor executes the program instructions further to:
determine whether a speed of a third tracking object is less than a preset speed and whether a difference between the speed of the third tracking object and the preset speed is greater than or equal to a preset speed difference threshold; and determining that the traveling environment information does not meet the vehicle following condition in a case that the speed of the third tracking object is less than the preset speed and the difference between the speed of the third tracking object and the preset speed is greater than or equal to the preset speed difference threshold, wherein the third tracking object is an obstacle in front of the host vehicle in the same lane as the host vehicle; or
determine whether a rest time period in which the host vehicle does not move is greater than or equal to a preset first waiting time period in a case that both the speed of the host vehicle and a speed of a third tracking object are zero; and determining that the traveling environment information does not meet the vehicle following condition in a case that the rest time period of the host vehicle is greater than or equal to the preset first waiting time period; or
determine whether a speed of a third tracking object is less than a preset speed and whether a difference between the speed of the third tracking object and the preset speed is greater than or equal to a preset speed difference threshold; counting a duration time period in which the difference between the speed of the third tracking object and the preset speed is greater than or equal to the preset speed difference threshold in a case that the speed of the third tracking object is less than the preset speed and the difference between the speed of the third tracking object and the preset speed is greater than or equal to the preset speed difference threshold; and determining that the traveling environment information does not meet the vehicle following condition in a case that the duration time period is greater than a preset second waiting time period.

13. A computer readable storage medium storing computer programs, wherein the computer programs, when executed by a processor, cause the processor to perform a vehicle lane-changing control method comprising:
controlling a host vehicle to travel into a neighboring to-be-turned-into lane with a first control rule;
acquiring a location relation between the host vehicle and a referential lane line in real time, wherein the referential lane line is located between the host vehicle and the to-be-turned-into lane, wherein the location relation comprises one or more of following situations: the host vehicle has not yet crossed the referential lane line, a front wheel of the host vehicle hits the referential lane line, a front wheel of the host vehicle totally crosses the referential lane line, a rear wheel of the host vehicle totally crosses the referential lane line, and the host vehicle travels parallel to the referential lane line;
determining whether the location relation meets a preset changing rule; and
controlling an action of the host vehicle with a second control rule corresponding to the preset changing rule in a case that the location relation meets the preset changing rule, wherein
lane-changing rules applied during lane-changing control are determined by actual lane-changing operations of a driver, and the lane-changing rules are divided based on lane-changing environment and the preset changing rule to acquire the first control rule and the second control rule,
wherein before the controlling a host vehicle to travel into a neighboring to-be-turned-into lane with a first control rule, the method further comprises:
acquiring traveling environment information on a surrounding environment of the host vehicle, wherein the traveling environment information comprises a speed of the host vehicle and a speed and an orientation of an obstacle in the same lane as the host vehicle and in a neighboring lane neighboring to the lane where the host vehicle locates; and
determining whether it is feasible for the host vehicle to change the lane where the host vehicle locates to a candidate lane based on the traveling environment information, wherein the candidate lane is a left neighboring lane or a right neighboring lane neighboring to the lane where the host vehicle locates; wherein
the host vehicle is controlled to travel into the neighboring to-be-turned-into lane with the first control rule in a case that it is feasible for the host vehicle to change the lane where the host vehicle locates to the candidate lane,
wherein the determining whether it is feasible for the host vehicle to change the lane where the host vehicle locates to a candidate lane comprises:
determining whether it is feasible for the host vehicle to change the lane where the host vehicle locates to the candidate lane based on speeds of the host vehicle, a first tracking object and a second tracking object, and distances from the host vehicle to the first tracking object and the second tracking object, wherein the first tracking object is an obstacle in front of the host vehicle in the candidate lane, and the second tracking object is an obstacle behind the host vehicle in the candidate lane, wherein the determining whether it is feasible for the host vehicle to change the lane where the host vehicle locates to the candidate lane based on speeds of the host vehicle, a first tracking object and a second tracking object, and distances from the host vehicle to the first tracking object and the second tracking object comprises:

acquiring a steering entry point of the host vehicle based on the speed of the host vehicle and a preset lateral acceleration threshold, wherein the steering entry point is located on a lane line between the host vehicle and the candidate lane;

determining whether a relative speed of the first tracking object with respect to the host vehicle is greater than or equal to zero and whether a distance between the first tracking object and the steering entry point is greater than a preview distance of the host vehicle after a first preset time, wherein the preview distance is a distance travelled by the host vehicle during a preset steering preview time period; and determining that a front lane-changing condition is met in a case that the relative speed of the first tracking object with respect to the host vehicle is greater than or equal to zero and the distance between the first tracking object and the steering entry point is greater than the preview distance after the first preset time;

determining whether a relative speed of the second tracking object with respect to the host vehicle is less than or equal to zero and whether a distance between the second tracking object and the steering entry point is greater than the preview distance after the first preset time; and determining that a back lane-changing condition is met in a case that the relative speed of the second tracking object with respect to the host vehicle is less than or equal to zero and the distance between the second tracking object and the steering entry point is greater than the preview distance after the first preset time; and determining that it is feasible for the host vehicle to change the lane where the host vehicle locates to the candidate lane after the first preset time in a case that both the front lane-changing condition and the back lane-changing condition are met.

* * * * *